US009526076B1

(12) United States Patent
Park

(10) Patent No.: US 9,526,076 B1
(45) Date of Patent: Dec. 20, 2016

(54) COMMUNICATION MODULE, VEHICLE INCLUDING THE SAME, AND METHOD FOR CONTROLLING THE VEHICLE

(71) Applicant: Hyundai Motor Company, Seoul (KR)

(72) Inventor: Yunjoong Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/173,863

(22) Filed: Jun. 6, 2016

(30) Foreign Application Priority Data

Nov. 6, 2015 (KR) .................. 10-2015-0155618

(51) Int. Cl.

| H04B 7/00 | (2006.01) |
|---|---|
| H04W 52/24 | (2009.01) |
| H04B 1/3827 | (2015.01) |
| H04W 4/02 | (2009.01) |
| H04W 4/04 | (2009.01) |
| H04W 28/02 | (2009.01) |
| G06F 3/0482 | (2013.01) |
| G06F 3/0484 | (2013.01) |
| B60L 11/18 | (2006.01) |

(Continued)

(52) U.S. Cl.
CPC ......... *H04W 52/246* (2013.01); *B60L 11/1844* (2013.01); *G06F 3/0482* (2013.01); *G06F 3/04842* (2013.01); *H02J 7/0027* (2013.01); *H04B 1/3827* (2013.01); *H04W 4/023* (2013.01); *H04W 4/046* (2013.01); *H04W 28/0221* (2013.01); *H04W 76/025* (2013.01); *H04W 84/12* (2013.01); *H04W 84/14* (2013.01); *H04W 88/06* (2013.01)

(58) Field of Classification Search
CPC .... H04W 52/246; H04W 4/023; H04W 4/046; H04W 28/0221; H04W 76/025; H04W 84/14; H04W 88/06; H04W 84/12; H04B 1/3827; G06F 3/0482; G06F 3/04842; B06L 11/1844; H02J 7/0027
USPC ................................. 455/522, 69, 41.1, 41.2
See application file for complete search history.

(56) References Cited

U.S. PATENT DOCUMENTS

| 6,452,910 B1 * | 9/2002 | Vij | ............................ H04L 12/66 370/310 |
|---|---|---|---|
| 8,731,475 B1 * | 5/2014 | Youngs | .................. G10L 25/51 455/220 |

(Continued)

FOREIGN PATENT DOCUMENTS

| JP | 2004-32164 | 1/2004 |
|---|---|---|
| JP | 2008-153773 | 7/2008 |

(Continued)

*Primary Examiner* — Dominic Rego
(74) *Attorney, Agent, or Firm* — Mintz Levin Cohn Ferris Glovsky and Popeo, P.C.; Peter F. Corless

(57) ABSTRACT

A communication module includes: a first transceiver configured to transmit and receive a signal using radio waves of a first frequency band; a second transceiver configured to transmit and receive a signal using radio waves of a second frequency band; a selection unit configured to select one of the first transceiver and the second transceiver; a processor configured to receive a use range of a hotspot function when the hotspot function is selected and to control the selection unit to select one of the first transceiver and the second transceiver is selected; and a power adjustment unit configured to adjust power in such a manner that a strength of radio waves is adjusted according to the received use range.

20 Claims, 16 Drawing Sheets

(51) Int. Cl.
*H02J 7/00* (2006.01)
*H04W 76/02* (2009.01)
*H04W 84/14* (2009.01)
*H04W 88/06* (2009.01)
*H04W 84/12* (2009.01)

(56) References Cited

U.S. PATENT DOCUMENTS

| | | | | |
|---|---|---|---|---|
| 8,948,698 B2* | 2/2015 | King, II | | H04W 76/025 455/345 |
| 9,226,295 B2* | 12/2015 | Negus | | H04W 76/025 |
| 9,401,801 B1* | 7/2016 | Park | | H04B 1/40 |
| 2005/0243777 A1* | 11/2005 | Fong | | H04L 12/66 370/338 |
| 2006/0248224 A1* | 11/2006 | Belhoula | | G01C 21/3605 709/238 |
| 2007/0103289 A1* | 5/2007 | Dagci | | G08B 25/007 340/521 |
| 2008/0045274 A1* | 2/2008 | Witkowski | | G07C 5/008 455/569.2 |
| 2009/0191892 A1* | 7/2009 | Kelley | | H04W 48/20 455/456.1 |
| 2010/0235891 A1* | 9/2010 | Oglesbee | | H04L 67/1095 726/5 |
| 2012/0009888 A1* | 1/2012 | Smadi | | H04W 72/1215 455/88 |
| 2012/0040606 A1* | 2/2012 | Verfuerth | | H05B 37/0218 455/7 |
| 2012/0078726 A1* | 3/2012 | Black | | G06Q 30/0251 705/14.66 |
| 2012/0164948 A1* | 6/2012 | Narasimha | | H04W 72/1215 455/63.1 |
| 2012/0228279 A1* | 9/2012 | Haas | | A41D 13/0051 219/211 |
| 2013/0045683 A1 | 2/2013 | Wang et al. | | |
| 2013/0103697 A1* | 4/2013 | Hill | | G06F 17/30312 707/748 |
| 2014/0053185 A1* | 2/2014 | Bleacher | | H04N 21/41422 725/26 |
| 2014/0122242 A1* | 5/2014 | Stephenson | | G06Q 30/0267 705/14.64 |
| 2015/0055564 A1 | 2/2015 | Alam et al. | | |
| 2015/0092676 A1* | 4/2015 | Periyalwar | | H04W 76/025 370/329 |
| 2016/0253651 A1* | 9/2016 | Park | | G06Q 20/34 |
| 2016/0259923 A1* | 9/2016 | Papa | | G06F 21/105 |
| 2016/0269469 A1* | 9/2016 | Ricci | | H04L 67/025 |
| 2016/0269867 A1* | 9/2016 | Zeng | | H04W 4/027 |

FOREIGN PATENT DOCUMENTS

JP    2013-211626    10/2013
KR    10-2012-0027738    3/2012

* cited by examiner

COMMUNICATION MODULE, VEHICLE INCLUDING THE SAME, AND METHOD FOR CONTROLLING THE VEHICLE

CROSS-REFERENCE TO RELATED APPLICATION

This application claims the benefit of and priority to Korean Patent Application No. 10-2015-0155618, filed on Nov. 6, 2015 in the Korean Intellectual Property Office, the disclosure of which is incorporated herein in its entirety by reference.

BACKGROUND

1. Technical Field

Embodiments of the present disclosure relate generally to a communication module, and more particularly, to a communication module configured to adjust the size of a communication available region, a vehicle including the same, and a method for controlling the vehicle.

2. Description of the Related Art

Current vehicles can perform various functions for enhancing user convenience, for example, functions relating to audio, video, navigation, air-conditioning control, seat heater control, communicating with an external terminal, etc. Vehicles may include a head unit configured to control additional functions, and may further include an input/output (I/O) device configured to input/output operation information of the additional functions. The vehicle may further include a communication module to communicate with a server, a base station (BS), or user equipment (UE) acting as an external terminal. Vehicles may also transmit and receive information to and from the server and the external terminal using the communication module, and may output the received information through a speaker, a display unit, and a vehicle terminal. The communication module may use a wired communication scheme and/or a wireless communication scheme for communication.

The vehicle may receive a variety of information from the UE using the communication module, may directly perform various functions of the UE, and may transmit a variety of information to the UE. However, the vehicle can communicate with the UE only within the internal space of the vehicle, and cannot communicate with the UE located outside of the vehicle.

SUMMARY

Therefore, it is an aspect of the present disclosure to provide a communication module to adjust a frequency band and strength of radio waves on the basis of the use range selected by a user when a hotspot function is performed, a vehicle including the same, and a method for controlling the vehicle. It is another aspect of the present disclosure to provide a communication module to adjust the use range of a hotspot function on the basis of the distance to a terminal (or UE), a vehicle including the same, and a method for controlling the vehicle.

Additional aspects of the disclosure will be set forth in part in the description which follows and, in part, will be obvious from the description, or may be learned by practice of the disclosure.

In accordance with embodiments of the present disclosure, a communication module includes: a first transceiver configured to transmit and receive a signal using radio waves of a first frequency band; a second transceiver configured to transmit and receive a signal using radio waves of a second frequency band; a selection unit configured to select one of the first transceiver and the second transceiver; a processor configured to receive a use range of a hotspot function when the hotspot function is selected and to control the selection unit to select one of the first transceiver and the second transceiver is selected; and a power adjustment unit configured to adjust power in such a manner that a strength of radio waves is adjusted according to the received use range.

The communication module may further include: a power conversion unit configured to convert power received from an external component into drive power.

The use range may include a first use range and a second use range larger than the first use range, and the processor may be further configured to control the selection unit to select the first transceiver upon receiving a selection signal of the first use range and to control the selection unit to select the second transceiver upon receiving a selection signal of the second use range.

The processor may be further configured to control the power adjustment unit to adjust the strength of radio waves to a first strength when the first transceiver is selected and to control the power adjustment unit to adjust the strength of radio waves to a second strength when the second transceiver is selected.

The processor may be further configured to transmit a stop signal of the hotspot function to an external terminal after lapse of a predetermined time from an execution time of the hotspot function.

Furthermore, according to embodiments of the present disclosure, a vehicle includes: an input unit configured to receive a hotspot function and a use range; a communication module including a first transceiver configured to transmit and receive a signal using radio waves of a first frequency band and a second transceiver configured to transmit and receive a signal using radio waves of a second frequency band, the communication module configured to communicate with an external server and an external terminal using the first transceiver and the second transceiver; a controller configured to, when the hotspot function and the use range are selected, transmit information regarding the selected hotspot function and the selected use range to the communication module; and a display unit configured to display information regarding the selected hotspot function and the selected use range. The communication module is further configured to select one of the first transceiver and the second transceiver based on the selected use range information and to adjust a strength of radio waves according to the selected use range.

The controller may be further configured to control the display unit to display a use available time of the hotspot function corresponding to the selected use range information.

The use range may include a first use range corresponding to an internal region of the vehicle and a second use range corresponding to an external region of the vehicle; and the communication module may be further configured to select the first transceiver when the first use range is selected and to select the second transceiver when the second use range is selected.

The communication module may be further configured to adjust strength of radio waves to a first strength when the first use range is selected and to adjust strength of radio waves to a second strength when the second use range is selected.

The communication module may be further configured to transmit a stop signal of the hotspot function to an external terminal after lapse of a predetermined time from an execution time of the hotspot function.

The vehicle may further include: a power-supply unit configured to perform charging or discharging; and a detection unit configured to detect a charge amount of the power-supply unit. The controller be further configured to transmit a stop signal of the hotspot function to an external terminal when the detected charge amount is less than or equal to a reference charge amount.

The second use range may include a plurality of regions having differing radii based on a vehicle position; and the communication module may be further configured to, when any one of the plurality of regions included in the second use range is selected, adjust the strength of radio waves according to a radius of the selected region.

The communication module may be further configured to increase the strength of radio waves in proportion to the increasing radius of the selected region.

Furthermore, according to embodiments of the present disclosure, a vehicle includes: an input unit configured to receive a selection signal of a hotspot function; a position receiver configured to receive a current position of the vehicle; a communication module including a first transceiver configured to transmit and receive a signal using radio waves of a first frequency band and a second transceiver configured to transmit and receive a signal using radio waves of a second frequency band, the communication module configured to communicate with an external server and an external terminal using the first transceiver and the second transceiver; and a controller configured to, when the hotspot function and the use range are selected, transmit information regarding the selected hotspot function and the selected use range to the communication module. The communication module is further configured to select one of the first transceiver and the second transceiver based on distance information and to adjust a strength of transmitted radio waves based on the distance information.

The communication module may be further configured to determine a use time of the hotspot function corresponding to a distance to the external terminal and to transmit a use time of the determined hotspot function to the external terminal.

The communication module may be further configured to select the first transceiver when the determined distance is shorter than a reference distance and to select the second transceiver when the determined distance is greater than or equal to the reference distance.

The communication module may be further configured to adjust the strength of radio waves to a first strength when the determined distance is less than a reference distance and to adjust the strength of radio waves to a second strength when the determined distance is greater than or equal to the reference distance.

The communication module may be further configured to, when the determined distance is greater than or equal to the reference distance, adjust the strength of radio waves according to respective distances and to increase the strength of radio waves in proportion to the increasing distance.

The vehicle may further include: a power-supply unit configured to perform charging or discharging; and a detection unit configured to detect a charge amount of the power-supply unit. The controller may be further configured to transmit a stop signal of the hotspot function to the external terminal when the detected charge amount is less than or equal to a reference charge amount.

The controller may confirm the amount of available data, and may transmit information regarding the confirmed data amount to the terminal.

The controller may be further configured to determine an amount of available data and to transmit information regarding the determined amount of available data to the external terminal.

Furthermore, according to embodiments of the present disclosure, a method for controlling a vehicle includes: displaying a plurality of use ranges on a display unit when a hotspot function is selected; when any one of the plurality of use ranges is selected, selecting any one of a plurality of transceivers based on the selected use range; and adjusting a strength of transmitted radio waves through the selected transceiver based on the selected use range.

The plurality of use ranges may include a first use range corresponding to an internal region of the vehicle and a second use range corresponding to an external region of the vehicle. The selecting of any one of the plurality of transceivers may include: selecting a first transceiver configured to transmit and receive a signal using radio waves of a first frequency band when the first use range is selected; and selecting a second transceiver configured to transmit and receive a signal using radio waves of a second frequency band when the second use range is selected. The adjusting the strength of radio waves may include: adjusting the strength of radio waves to a first strength when the first use range is selected; and adjusting the strength of radio waves to a second strength greater than the first strength when the second use range is selected.

The second use range may include a plurality of regions having differing radii based on a vehicle position. When any one of the plurality of regions included in the second use range is selected, the adjusting of the strength of radio waves may include adjusting the strength of radio waves according to a radius of the selected region.

The method may further include: comparing a charge amount of a power-supply unit to a reference charge amount, and transmitting a stop signal of a hotspot function to an external terminal when the charge amount of the power-supply unit is less than or equal to the reference charge amount.

The method may further include: when an automatic selection function is selected, recognizing a position of a terminal and the position received by a position receiver and determining a distance to the terminal; and selecting any one of the plurality of transceivers based on the determined distance.

The method may further include: determining an amount of available data; and transmitting information regarding the determined amount of available data.

The method may further include: determining whether a terminal is in a connected state; and switching to a sleep mode when the terminal is in a disconnected state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF THE EMBODIMENTS

Figure 1:
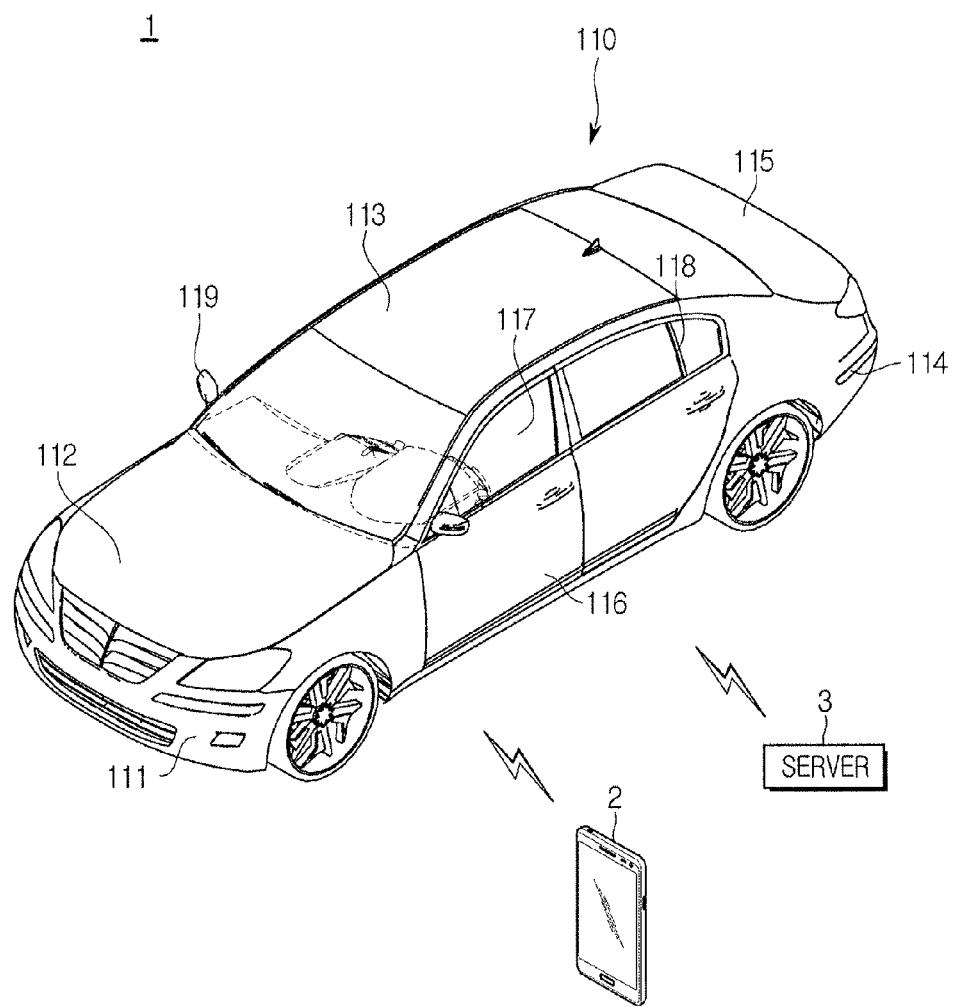
FIG. 1 is a view illustrating the appearance of a vehicle according to embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Reference will now be made in detail to the embodiments of the present disclosure, examples of which are illustrated in the accompanying drawings, wherein like reference numerals refer to like elements throughout.

Figure 2:
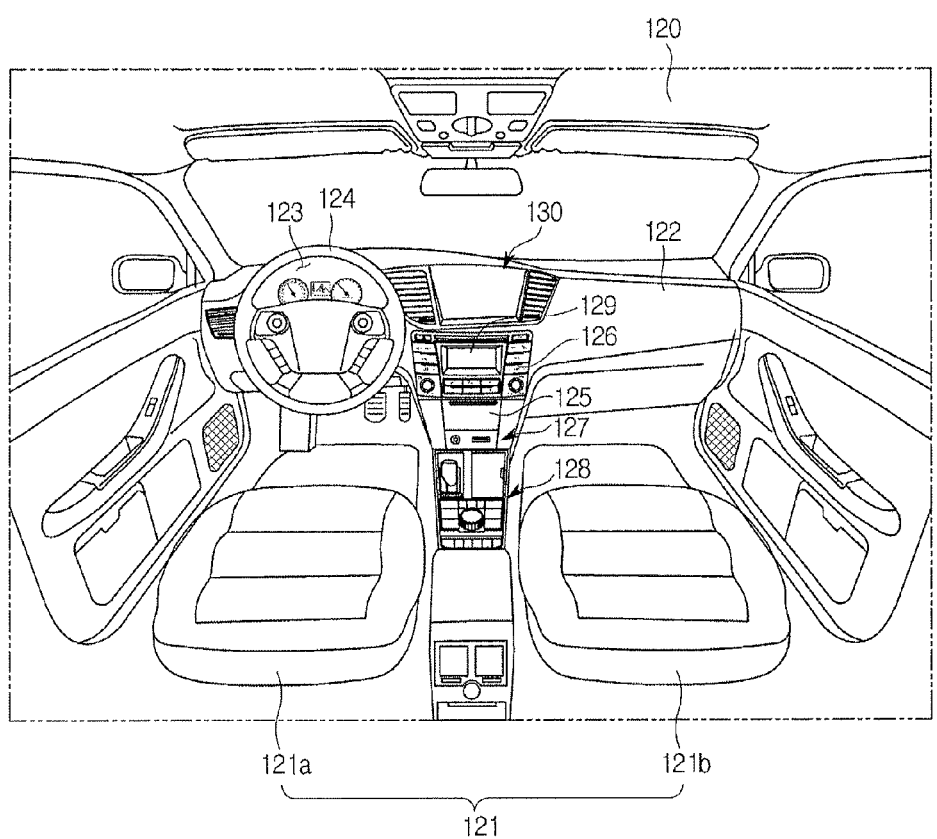
FIG. 2 is a view illustrating the internal structure of the vehicle according to embodiments of the present disclosure.

FIG. 1 is a view illustrating the appearance of a vehicle according to embodiments of the present disclosure. FIG. 2 is a view illustrating the internal structure of the vehicle according to embodiments of the present disclosure.

As is known in the art, a vehicle 1 is an apparatus that moves along a road by driving vehicle wheels for the purpose of transporting persons or cargo. The vehicle 1 may include a body having interior and exterior parts and a chassis which is a remaining portion other than the body and is equipped with mechanisms required for driving thereof.

As shown in FIG. 1, the exterior part 110 of the body may include a front panel 111, a bonnet 112, a roof panel 113, a rear panel 114, a trunk 115, and front-rear and left-right doors 116.

The exterior part 110 of the body may include the front panel, the bonnet, the roof panel, the rear panel, the trunk, and the front-rear and left-right doors 116, and may further include windows 117 installed at the front-rear and left-right doors 116, and pillars 118 provided at boundaries between the front-rear and left-right doors 116.

In addition, the windows installed at the front-rear and left-right doors 116 may further include side windows; quarter windows which are installed between the pillars so as not to be openable and closable; a rear glass installed to the rear part; and a front window installed to the front part.

The exterior part 110 of the vehicle may further include side-view mirrors 119 to provide a rear view of the vehicle 1 to a vehicle driver.

As shown in FIG. 2, the interior part 120 of the vehicle includes seats (121: 121a, 121b) on which a passenger sits; a dashboard 122; an instrument panel 123 (i.e., a cluster) (including a tachometer, a speedometer, a coolant thermometer, a fuel gauge, a turn signal indicator, a high beam indicator light, a warning light, a seat belt warning light, a mileage indicator, an odometer, an automatic transmission shift indicator, a door open warning light, an engine oil warning light, and a low fuel warning light, which are arranged on the dashboard to output information related to driving); a steering wheel 124 to adjust a traveling direction of the vehicle; and a center fascia 125 extended from the dashboard 122 to the vicinity of the seats 121.

The seats 121 may include a driver's seat 121a for a driver, a passenger seat 121b for a fellow passenger, and a rear seat arranged in the rear of the vehicle 1.

The seats 121 may include heating elements therein.

The cluster 123 may be implemented as a digital cluster. The digital cluster may visually display vehicle information and traveling information.

The center fascia 125 may include a head unit 125 disposed between the driver's seat 121a and the passenger seat 121b of the dashboard 122.

That is, the head unit 126 may be connected to a variety of loads needed to perform various functions (e.g., an audio function, a radio function, an air-conditioning function, a heating function of the seats, a navigation function, a DMB function, a telephone function, etc.), such that the head unit 126 may receive an operation command for performing each function, may control respective functions according to the received operation command or may transmit the operation command to the corresponding load.

The center fascia 125 may include an air vent, a cigarette lighter receptacle, a multi-port 127, etc. therein.

The multi-port 127 may be located adjacent to the head unit 126, and may further include, for example, a universal serial bus (USB) port, an auxiliary (AUX) port, and a Secure Digital (SD) slot.

The vehicle 1 may further include an input unit 128 configured to receive an operation command of at least one function from among a plurality of functions capable of being executed in the vehicle 1. The vehicle 1 may further include a display unit 129 configured to display not only information regarding the executed function but also user-input information.

The input unit 128 may be provided in the head unit 126, and may include an ON-OFF button of respective functions and at least one physical button (e.g., a button for changing the setting values of respective functions).

The input unit 128 may be provided in the center fascia 125. In this case, the input unit 128 may be implemented as a jog dial (not shown) or touchpad through which the user can input a movement command of a cursor displayed on the display unit of the terminal 130, a selection command, etc.

The display unit 129 may be implemented as a flat panel display, for example, a Liquid Crystal Display (LCD) panel, a Light Emitting Diode (LED) panel, an Organic Light Emitting Diode (OLED) panel, etc., without being limited thereto.

The center fascia 125 may include a vehicle's terminal (or UE) 130 (such as a user interface (UI)) for receiving information from the user and outputting the result corresponding to the user-input information.

The terminal 130 (or UE) may include an input unit and a display unit. If at least one of a navigation function, a DMB function, an audio function, a video function, a telephone function, and a radio function is selected, the terminal 130 may perform the selected function and may display operation information of the executed function. In addition, the terminal 130 for the vehicle may receive a selection command of the hotspot function. If the hotspot function is selected, the terminal 130 may display a plurality of selection regions capable of being selected by the user.

The input unit of the terminal 130 may include a touch panel incorporated with the display unit of the terminal 130.

The input unit of the terminal 130 may be implemented as a button and then displayed on the display unit of the terminal. In this case, the input unit of the terminal 130 may receive position information of the displayed button.

The input unit and the display unit of the terminal 130 may be implemented as a touchscreen. A stationary-type terminal may be installed on the dashboard.

The chassis of the vehicle may further include a power generation system, a power transmission system, a traveling system, a steering system, a brake system, a suspension system, a speed change system, a fuel supply device, and front-rear and left-right wheels.

The vehicle 1 may further include various safety devices configured to guarantee safety of the vehicle driver and passengers. There are various kinds of vehicle safety devices, for example, an airbag control device for safety of the driver and passengers during vehicle collision, an electronic stability control (ESC) device for stabilizing vehicle orientation during acceleration or cornering of the vehicle, etc.

Additionally, the vehicle 1 may include a variety of sensing devices, for example, a proximity sensor to detect the presence or absence of obstacles or other vehicles located at the lateral and rear directions of the vehicle 1, a rain sensor to detect the presence or absence of rainfall and the amount of rainfall, etc. The vehicle 1 may selectively include a hands-free device for driver convenience, an audio device and a Bluetooth device, a rear-view camera, a UE charging device, and a high-pass device. The vehicle 1 may further include an ignition button configured to input an operation command to the starter motor (not shown). That is, if the ignition button is switched on, the vehicle 1 may operate the starter motor (not shown), and may drive the engine (not shown) acting as the power generation device using the starter motor.

The vehicle 1 may include a power generation system, a power transmission system, a traveling system, a steering system, a brake system, a suspension system, a speed change system, a fuel supply device, and an electronic control unit (ECU) 140 for controlling driving of various safety devices and various sensors. The vehicle 1 may further include a communication module 150 configured to perform location tracking, Internet access, remote vehicle diagnosis, accident sensing, transportation information, and a communication service related to a home network over a communication and broadcast network.

The communication module 150 may allow a user to remotely diagnose the vehicle through a wireless network, may allow the user to use various information (e.g., transportation and living information, emergency relief information, etc.), may transmit a telephone message to another party, may allow the user to transmit/receive a voice mail to/from another party, and may download an audio book as necessary.

The communication module 150 may perform various services according to service types, for example, a news reception, stock price, electronic commerce (E-commerce), financial transactions, hotel reservation, facsimile transmission/reception, games, and a car accident and car theft notification service. Specifically, if a traffic accident occurs, the communication module 150 may automatically track the position of the accident vehicle using GPS such that it can transmit the position of the accident vehicle to the nearest 119 Rescue Center.

The communication module 150 may communicate with the terminal 2 acting as user equipment (UE), may communicate with a server 3 through a base station (BS). The communication module 150 may communicate with various kinds of electronic devices embedded in the vehicle.

The communication module 150 may include a CAN communication module, a Wi-Fi communication module, a USB communication module, and a Bluetooth communication module. The communication module 150 may further include a GPS reception module to acquire position information from a satellite, and may further include a broadcast communication module such as DMB Transport Protocol Experts Group (TPEG), SXM, and RDS.

The communication module 150 may relay a wireless network using radio waves of a first frequency band, or may relay a wireless network using radio waves of the second frequency band. That is, the communication module 150 may perform the hotspot function.

The vehicle 1 may further include a power-supply unit 180 electrically connected to various electronic devices such that the driving power is supplied to the electronic devices. For example, the electronic devices may include a terminal (or UE), an audio device, interior lighting, heating elements of the seats, a starter motor, a communication module, headlights, an ECU, and other electronic devices.

The power-supply unit 180 is a chargeable/dischargeable battery, and performs charging using a generator or engine power during vehicle traveling. The starter motor may be driven by an external remote signal. The vehicle may further include a remote controller to operate the starter motor remotely.

The terminal 2 may be user equipment (UE) communicating with the vehicle. That is, the UE 2 may be a tablet PC, a mobile phone, a smartphone, a laptop, or a PDA.

The server 3 may monitor or control the entire network, may connect to other networks through a public network, and may share a plurality of software such as data, programs, and files. The server 3 may perform a service upon receiving a user request. In this case, the server 3 may communicate with the pre-registered vehicle 1, and may store data use information of the user of the pre-registered vehicle.

The data use information of the user may include the total amount of data, the used data amount from among the total amount of data, the amount of available data, a data usage fee, etc. Upon receiving the stop signal of the hotspot function from the communication module of the vehicle, the server 3 may transmit the stop signal of the hotspot function to the registered terminal (UE) 2, such that the server 3 may indicate the discharging state of the power-supply unit of the vehicle.

Constituent components of the vehicle will hereinafter be described with reference to FIGS. 3 and 4.

Figure 3:
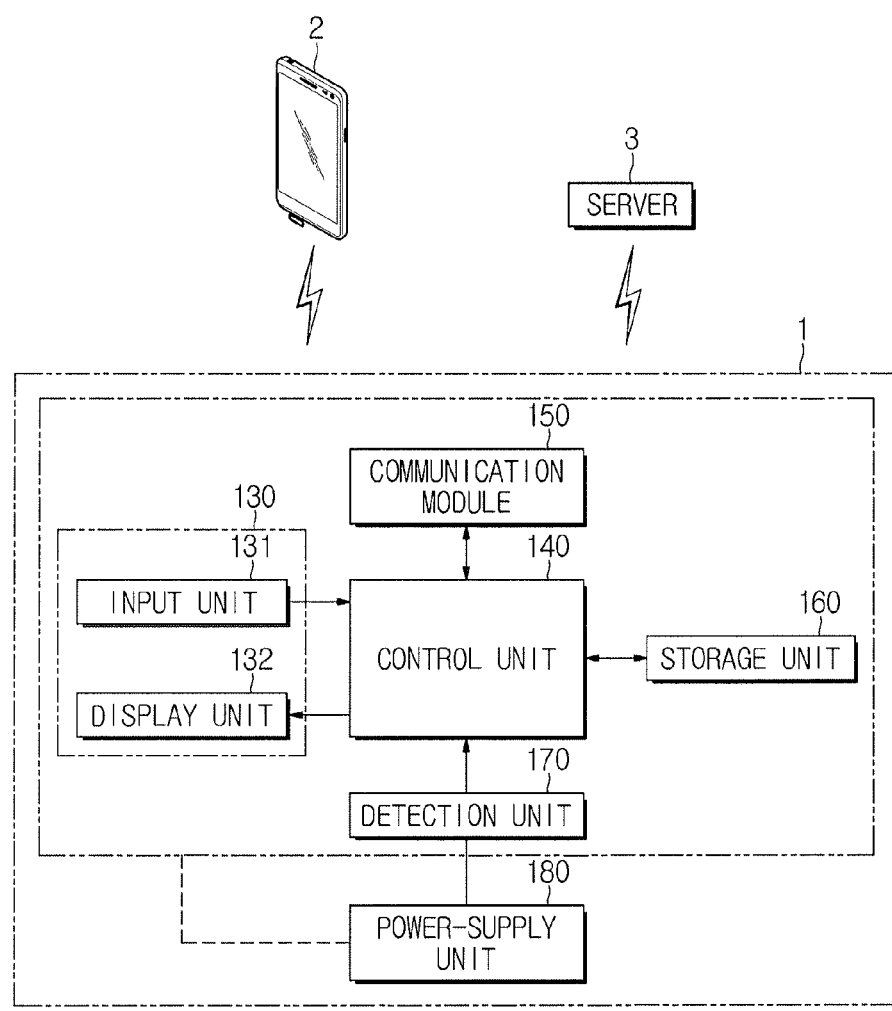
FIG. 3 is a block diagram illustrating a vehicle according to embodiments of the present disclosure.

FIG. 3 is a block diagram illustrating a vehicle according to embodiments of the present disclosure. FIG. 4 is a detailed block diagram illustrating a communication module embedded in the vehicle according to embodiments of the present disclosure.

As shown in FIG. 3, the vehicle 1 may include an input unit 131 of the user interface (UI) 130, a display unit 132, a control unit 140, a communication module 150, a storage unit 160, a detection unit 170, and a power-supply unit 180.

The input unit 131 may allow the user to select the network setting function, may allow the user to select the hotspot function through the selected network setting function, and may allow the user to select the use range of the hotspot function.

The display unit 132 may display information regarding the user equipment (UE) connected through communication, and selection or release information of the hotspot function. In this case, the hotspot setting window may display information regarding selection or non-selection of the hotspot function and the available range of the hotspot function thereon, and may display information regarding the use range capable of selecting the available range.

The display unit 132 may display the charge amount of the power-supply unit 180. The charge amount of the power-supply unit 180 may be displayed in the form of a progress bar. The display unit 132 may display information regarding the hotspot usage time corresponding to the charge amount of the power-supply unit, and may display the total amount of data, the amount of used data, and the remaining amount of data.

In addition, the vehicle may input and output information regarding the hotspot function using the input unit 128 and the display unit 129 mounted to the center fascia.

If the vehicle stops driving, the control unit 140 may maintain the operation of the communication module 150 and the operations of the user interface (UI), the control unit, the storage unit, and the detection unit needed to operate the communication module 150, and may stop the operations of various devices embedded in the vehicle.

If the network setting function is selected through the input unit 131, the control unit 140 may control display of the network setting window. If the hotspot function from among the network setting functions is selected, display of the selected hotspot setting window is controlled. If any one from among the plurality of use ranges is selected, the communication module 150 may be controlled such that the frequency band and strength of radio waves can be controlled by the communication module 150.

The plurality of use ranges may include a first use range indicating an interior region of the vehicle and a second use range larger in size than the first use range. The second use range may indicate the exterior range of the vehicle.

If the hotspot function is selected on the condition that the vehicle stops driving, the control unit 140 may confirm the charge amount (detected by the detection unit) of the power-supply unit 180. If the confirmed charge amount is equal to or less than the reference amount, the stop signal of the hotspot function is transmitted to the server 3, such that the server may transmit the stop signal of the hotspot function to the external terminal 2.

If the hotspot function is selected on the condition that the vehicle stops driving, the control unit 140 may confirm the charge amount (detected by the detection unit) of the power-supply unit 180. If the confirmed charge amount is equal to or higher than the reference charge amount, the stop signal of the hotspot function may be directly transmitted to the external terminal 2 through the communication module 150.

If a predetermined time elapses from the hotspot function execution time, the control unit 140 may also transmit the stop signal of the hotspot function to the server 3 or the external terminal 2.

The control unit 140 may enter the sleep mode when a predetermined time elapses from the transmission time of the stop signal of the hotspot function. The control unit 140 may switch to the sleep mode when UE connection is disconnected during the hotspot function. If the external terminal (or UE) is re-connected, the control unit 140 switches from the sleep mode to the normal mode, such that the external terminal (or UE) 2 can perform the hotspot function. The control unit 140 may check the amount of data used in the hotspot function, may control display of the amount of used data, and may also control display of the stop information of the hotspot function. If the hotspot function is selected on the condition that the vehicle starts driving, the control unit 140 may stop the operation for confirming the charge amount of the power-supply unit, and may control transmission of the hotspot function stop signal by confirming only the amount of used data.

The communication module 150 may include a CAN communication module, a Wi-Fi communication module, a USB communication module, and a Bluetooth communication module. The communication module 150 may further include a global positioning system (GPS) reception module to acquire position information from a satellite, and may further include a broadcast communication module such as DMB Transport Protocol Experts Group (TPEG), SXM, and RDS. The communication module 150 may communicate with the user equipment (UE) 2, may communicate with the server 3 through the base station (BS), and may also communicate with various electronic devices embedded in the vehicle.

Upon receiving the selection signal of the hotspot function and the selection signal of the use range, the communication module 150 may relay the wireless network using radio waves of the first frequency band, or may relay the wireless network using radio waves of the second frequency band. That is, the communication module 150 may provide the hotspot function.

If the first use range from among the plurality of use ranges is selected, the communication module 150 may transmit radio waves of the first frequency band by controlling a first transceiver, and may control the strength of transmit (Tx) radio waves at a first strength by controlling a power adjustment unit.

If the second use range from among the plurality of use ranges is selected, the communication module 150 may transmit radio waves of the second frequency band by controlling the second transceiver, and may control the strength of Tx radio waves at a second strength by controlling the power adjustment unit.

The communication module 150 will hereinafter be described with reference to FIG. 4.

Figure 4:
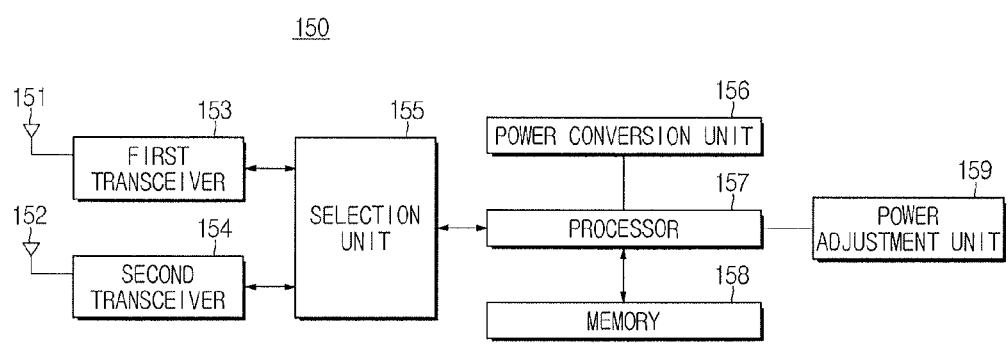
FIG. 4 is a block diagram illustrating a communication module embedded in a vehicle according to embodiments of the present disclosure.

As shown in FIG. 4, the communication module 150 may include a first antenna 151, a second antenna 152, a first transceiver 153, a second transceiver 154, a selection unit 155, a power conversion unit 156, a processor 157, a memory 158, and a power adjustment unit 159.

The first antenna 151 may emit the radio waves of the first frequency band at the first strength, and may receive external radio waves.

The second antenna 152 may emit the radio waves of the second frequency band at the second strength, and may receive external radio waves.

During data transmission, the first transceiver 153 may convert the Alternating Current (AC) voltage into electromagnetic waves, and then emit the electromagnetic waves into the air through the first antenna. During data reception, the first transceiver 153 may convert the electromagnetic waves received by the first antenna into the AC voltage, and then transmit the AC voltage to the processor.

During data transmission, the second transceiver 154 may convert the AC voltage into electromagnetic waves, and then emit the electromagnetic waves into the air through the second antenna. During data reception, the second transceiver 154 may convert the electromagnetic waves received by the second antenna into the AC voltage, and then transmit the AC voltage to the processor.

The selection unit 155 may control the switch contained in the selection unit on the basis of the command received from the processor, such that the first transceiver or the second transceiver may be connected to the processor. That is, the selection unit 155 may transmit or receive radio waves through the first transceiver, or may transmit or receive radio waves through the second transceiver.

The power conversion unit 156 may convert power supplied to the power-supply unit into the other power needed to operate the communication module 150, and may transmit the conversion resultant power to various constituent elements of the communication module.

The processor 157 may receive the signal from the control unit 140, and may control the selection unit on the basis of the received signal.

In more detail, if the first use range from among the plurality of use ranges is selected, the processor 157 may transmit a selection signal of the first transceiver to the selection unit. If the second use range is selected, the processor 157 may transmit a selection signal of the second transceiver to the selection unit.

If the first use range is selected, the processor 157 may control the power adjustment unit such that the strength of radio waves communicated through the first transceiver can be adjusted at the first strength. If the second use range is selected, the processor 157 may control the power adjustment unit such that the strength of radio waves communicated with the second transceiver can be adjusted at the second strength. After a predetermined time elapses from the execution time of the hotspot function, the processor 157 may also transmit the stop signal of the hotspot function to the external terminal.

The memory 158 may store information regarding the frequency band for each use range and information regarding the strength of the radio waves for each use range. In this case, the use range may include a first use range for employing the hotspot function in the interior region of the vehicle, and a second use range for employing the hotspot function in the exterior region of the vehicle. In the first use range, the use range is set to a first radius such that the hotspot function can be used in the interior region of the vehicle. In the second use range, the use range is set to a second radius such that the hotspot function can be used in the exterior region of the vehicle.

The frequency band of the first use range from among the frequency band information may include about 5 GHz, and the frequency band of the second use range may include about 2.4 GHz. Since about 2.4 GHz is affected by peripheral crosstalk, it may be difficult to reach maximum speed at 1 m or less. However, although the separation distance is 4 m or greater and an obstacle exists, radio waves can be stably transmitted and received at a transfer rate of about 38 Mbps without speed reduction.

Since about 5 GHz is less affected by peripheral crosstalk within the distance of 1 ms or less, if the separation distance is 4 m or greater and an obstacle exists, the transfer rate is deteriorated and a delay time is unavoidably increased.

Therefore, assuming that the communication module uses the hotspot function within the distance (i.e., the first use range) close to the communication module, radio waves of the frequency band of about 5 GHz may be used. In the case of using the hotspot function at a remote site (i.e., the second use range) of the communication module, the radio waves of the frequency band of about 2.4 GHz may be used.

The power adjustment unit 159 may adjust the strength of radio waves to the first strength on the basis of a command of the processor 157, or may adjust the strength of radio waves to the second strength. That is, the strength of the radio waves may be adjusted to the first strength when the first use range is selected, and the strength of the radio waves may be adjusted to the second strength when the second use range is selected.

The power adjustment unit 159 may include at least one of the voltage adjustment unit and the current adjustment unit. If the vehicle stops driving, the power adjustment unit 159 may operate only the communication module. In this case, the communication module may autonomously control the hotspot function.

The communication module may be used as an access point (AP) acting as the base station (BS). The communication module may transmit the signal received from the communication module of the external terminal to the network (e.g., the server) using the radio waves obtained when the frequency band and strength are adjusted, and may transmit the signal received from the network to the external terminal.

The storage unit 160 may store identification (ID) information of the UE capable of using the hotspot function and display information for each use range. The storage unit 160 may further store the usage time of the hotspot function corresponding to the charge amount of the power-supply unit.

The detection unit 170 may be connected to the power-supply unit 180 such that it can detect the charge amount of the power-supply unit 180 and can transmit information regarding the detected charge amount to the control unit 140. The detection unit 170 may include a current detection unit to detect a current of the power-supply unit, a voltage detection unit to detect a voltage of the power-supply unit, or a power detection unit to detect power of the power-supply unit.

Figure 5:
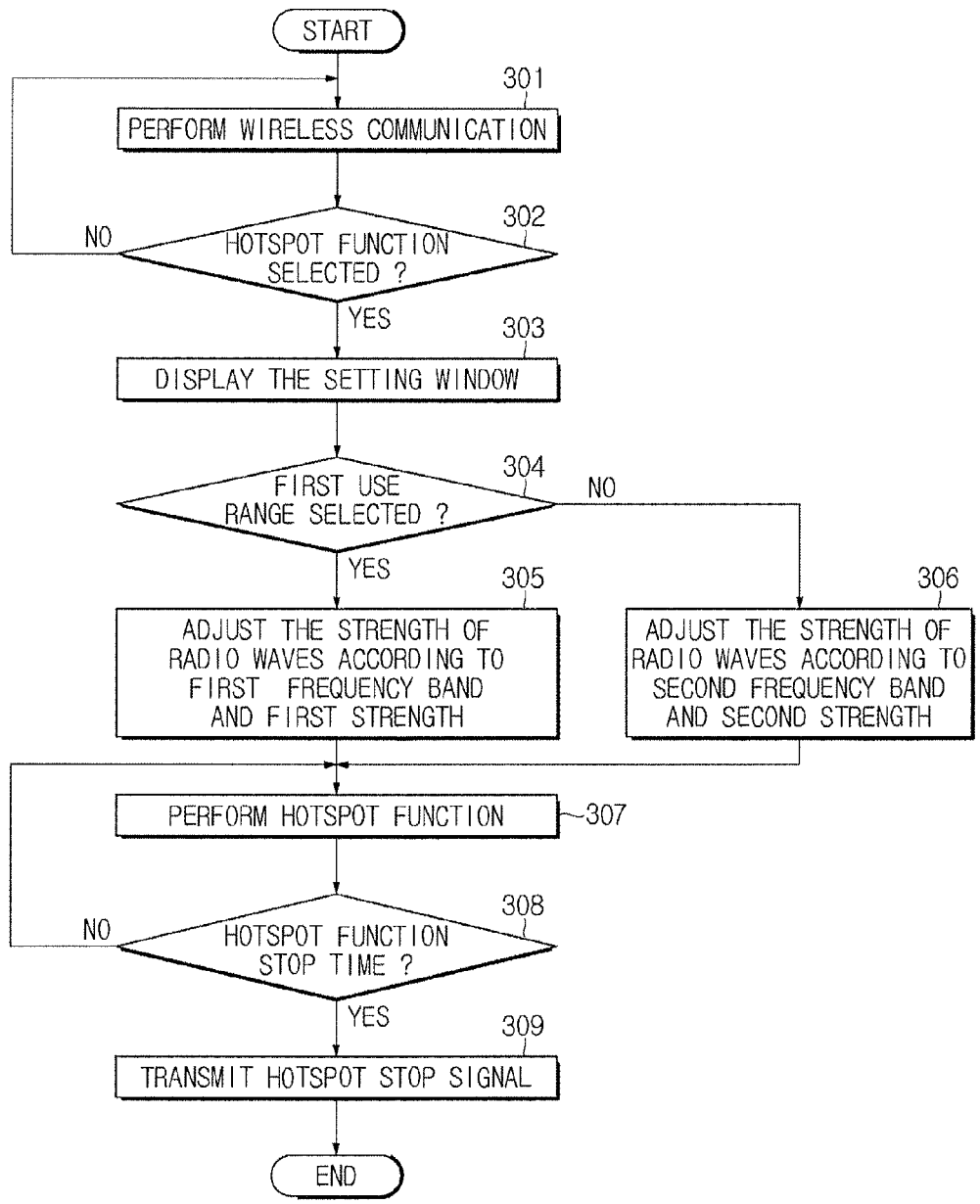
FIG. 5 is a flowchart illustrating a method for controlling a vehicle to perform a hotspot function for each use range according to embodiments of the present disclosure.

FIG. 5 is a flowchart illustrating a method for controlling a vehicle to perform a hotspot function for each use range according to embodiments of the present disclosure. The method for controlling the vehicle shown in FIG. 5 will hereinafter be described with reference to FIGS. 6, 7A and 7B.

As shown in FIG. 5, the vehicle may wirelessly communicate with the server when the vehicle starts driving or stops driving in operation 301.

If the vehicle stops driving, the vehicle may operate the communication module 150, and may operate only the UI, the control unit, the storage unit, and the detection unit for operating the communication module 150, such that various devices embedded in the vehicle may stop operation.

If the network setting function is selected through the input unit 131, the vehicle may display the network setting window.

If the hotspot function from among the network setting functions is selected by the user in operation 302, the vehicle may display the selected hotspot setting window in operation 303.

Figure 6:
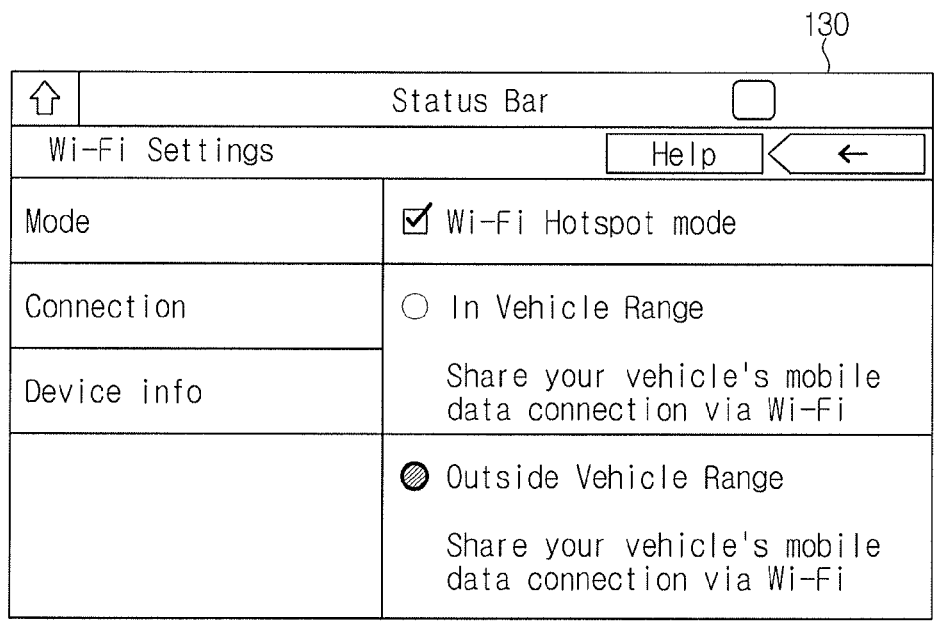
FIG. 6 exemplarily illustrates a hotspot setting window of a vehicle according to embodiments of the present disclosure.

As shown in FIG. 6, the display unit 132 may display the hotspot selection box. If the selection signal of the hotspot selection box is received by the input unit 131, the display unit 132 may display information regarding the first use range (i.e., the interior region of the vehicle) and information regarding the second use range (i.e., the exterior region of the vehicle).

In this case, the operation for displaying the first use range and the second use range may include: activating the selection box of the first use range and the selection box of the second use range: and displaying the activated selection boxes.

If any one of the first use range and the second use range is selected, the selection box of the unselected use range is deactivated. In this case, the operation for activating the selection box may include displaying the corresponding selection box with a darker color as compared to the unselected selection box.

In accordance with embodiments, the display unit 132 may be incorporated with the input unit 131 acting as a touch panel. That is, the input unit and the display unit may be implemented as a touchscreen.

The vehicle may determine a selection signal of the selection range received from the input unit 131, and may transmit the selection signal of the confirmed selection signal to the communication module 150.

Upon receiving the selection signal of the first use range from among the plurality of use ranges in operation 304, the communication module of the vehicle may control the selection unit such that it transmits the radio waves of the first frequency band through the first transceiver. In this case, the communication module may control the power adjustment unit and may adjust the strength of the radio waves of the first frequency band to the first strength in operation 305.

Figure 7A:
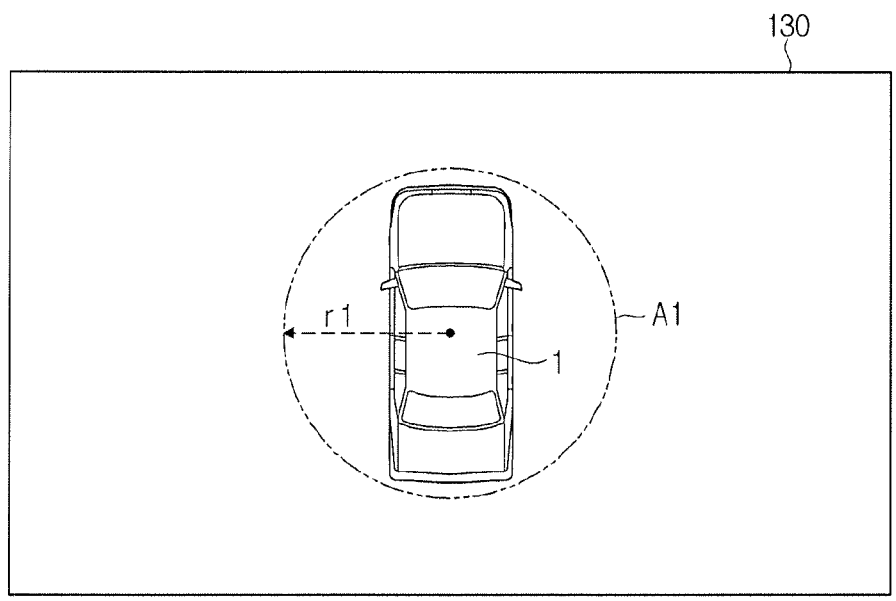
FIGS. 7A and 7B are conceptual diagrams illustrating a method for displaying information regarding the use range of the hotspot function of the vehicle according to embodiments of the present disclosure.

As shown in FIG. 7A, the vehicle 1 may display a use range of the first radius (r1) in which the hotspot function can be used on the basis of the vehicle position, and may display the use range of the first radius (r1) on the display unit 132. The vehicle 1 may relay the wireless network within the range of the first radius (r1) using the radio waves (having the first strength) of the first frequency band.

Upon receiving the selection signal of the second use range from among the plurality of use ranges, the communication module of the vehicle may transmit the radio waves of the second frequency band through the second transceiver by controlling the selection unit. In this case, the communication module may adjust the strength of the radio waves of the second frequency band to the second strength by controlling the power adjustment unit in operation 306.

Figure 7B:
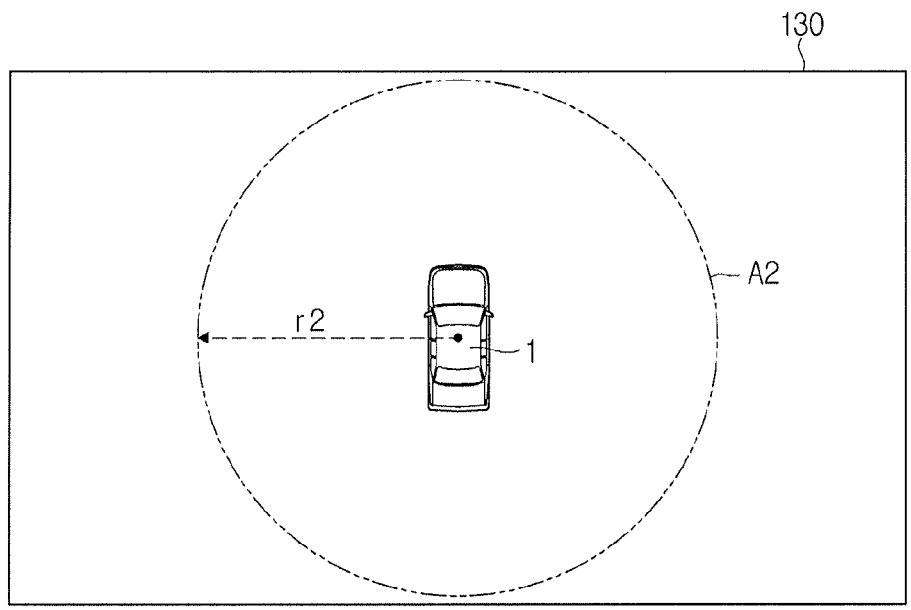

As shown in FIG. 7B, the vehicle 1 may display the use range of the second radius (r2) in which the hotspot function can be used on the basis of the vehicle position, on the display unit 132 of the vehicle. The vehicle 1 may relay the wireless network within the range of the second radius (r2) using the radio waves (having the second strength) of the second frequency band. In this case, the second strength of the radio waves may be higher than the first strength.

The vehicle may adjust the frequency band and strength of the radio waves on the basis of the use range selected by the user, such that it can perform the hotspot function in operation 307. That is, the external terminal may execute the wireless network using the hotspot function supplied from the communication module located inside or outside the vehicle.

The vehicle may determine whether a current time is the stop time of the hotspot function during execution of the hotspot function in operation 308. If the current time is the stop time of the hotspot function, the vehicle may transmit the hotspot stop signal to the server or the external terminal in operation 309. In this case, the operation for determining whether the current time is the stop time of the hotspot function may include determining whether the amount of used data reaches a predetermined amount of data.

In addition, the operation for determining whether the current time is the stop time of the hotspot function may include determining whether the charge amount of the power-supply unit of the vehicle is equal to or less than the reference charge amount. The operation for determining whether the current time is the stop time of the hotspot function may further include determining whether a predetermined time elapses from the start time of the hotspot function.

In more detail, if the hotspot function is selected on the condition that the vehicle stops operation, the vehicle may determine the charge amount (detected by the detection unit) of the power-supply unit 180. If the determined charge amount is equal to or less than the reference charge amount, the vehicle may transmit the stop signal of the hotspot function to the server 3. In this case, the server may transmit the stop signal of the hotspot function to the external terminal 2.

If the hotspot function is selected irrespective of the ON/OFF operations of the vehicle starting, the vehicle may determine the amount of data used during the setting time. After the amount of used data is compared with the predetermined data amount, if the amount of used data is greater than or equal to a predetermined amount of data, the vehicle may transmit the stop signal of the hotspot function to the server 3. In this case, the server 3 may transmit the stop signal of the hotspot function to the external terminal 2.

In addition, the server may determine the amount of used data through the communication module of the vehicle during the predetermined period of time. That is, the server 3 may transmit the stop signal of the hotspot function to the external terminal on the basis of the amount of used data and the predetermined amount of data.

Upon receiving the remote signal on the condition that the hotspot function stops operation by the charge amount of the power-supply unit, the vehicle may start driving, may perform charging of the power-supply unit, and may switch from the sleep mode to the normal mode such that the hotspot function can be re-performed.

Assuming that the detection unit is not contained in the vehicle, if the predetermined time has elapsed from the start time of the hotspot function so as to prevent the power-supply unit from being discharged, the vehicle may also transmit the stop signal of the hotspot function to the server 3 or the external terminal 2.

Figure 8:
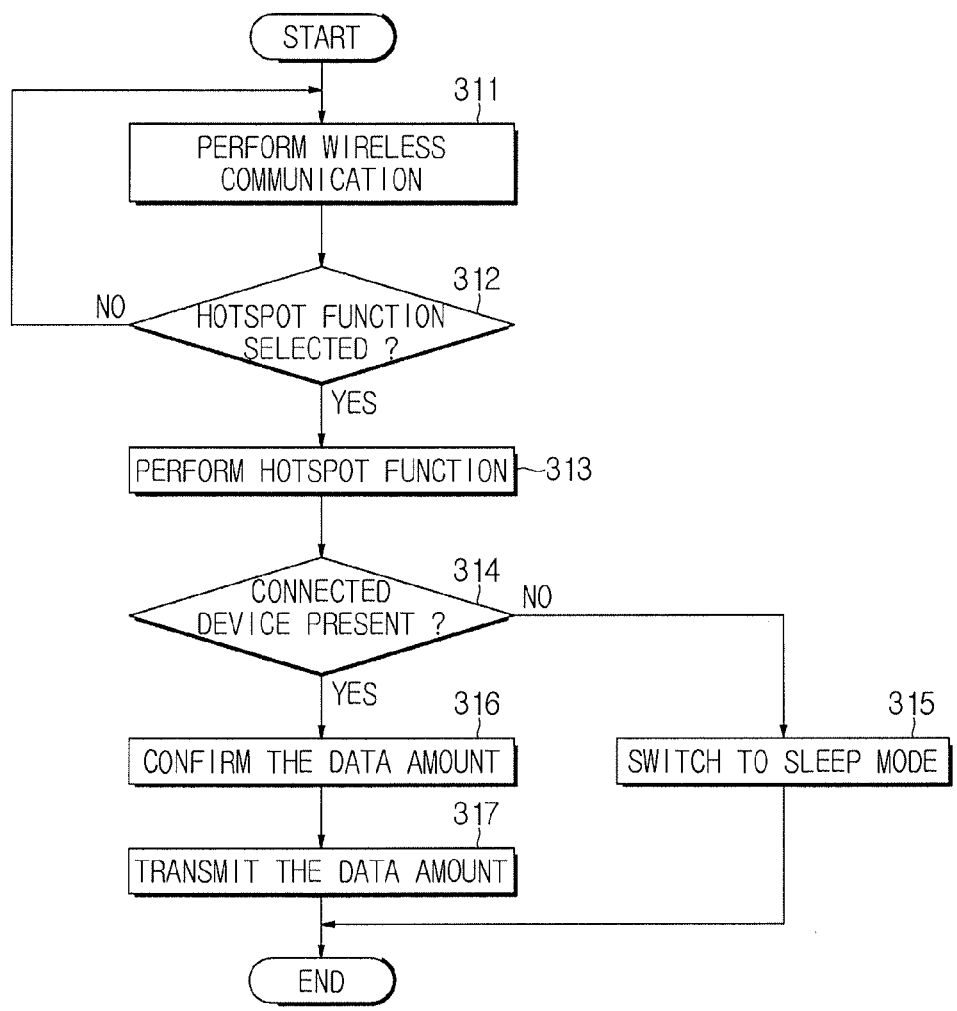
FIG. 8 is a flowchart illustrating a method for controlling the vehicle so as to switch to the sleep mode according to embodiments of the present disclosure.

FIG. 8 is a flowchart illustrating a method for controlling the vehicle so as to switch to the sleep mode according to embodiments of the present disclosure.

As shown in FIG. 8, the vehicle may perform wireless communication with the server when the vehicle starts driving and stops driving in operation 311.

If the network setting function is selected through the input unit 131, the vehicle may display the network setting window.

If the hotspot function from among the network setting functions is selected by the user in operation 302, the vehicle may display the setting window of the selected hotspot function.

The vehicle may adjust the frequency band and strength of the Tx radio waves on the basis of the selection signal of the selection range received from the input unit 131. As a result, the vehicle may perform the hotspot function in operation 313.

The vehicle may determine the presence or absence of the external terminal 2 wirelessly connected during the execution of the hotspot function in operation 314. If the absence of the external terminal 2 is determined, the vehicle may switch to the sleep mode in operation 315.

If the external terminal 2 is re-connected to the vehicle, the vehicle switches from the sleep mode to the normal mode, such that the external terminal 2 can perform the hotspot function.

In other words, if the presence of the external terminal 2 connected through wireless communication is determined, the amount of data used in the setting time may be confirmed in operation 316. The confirmed data amount is transmitted to the server 3 or the external terminal 2 in operation 317, such that the user can confirm the amount of used data.

In addition, the vehicle may also transmit the remaining time and the remaining data amount to the server 3 or the external terminal 2 during the setting time.

Figure 9:
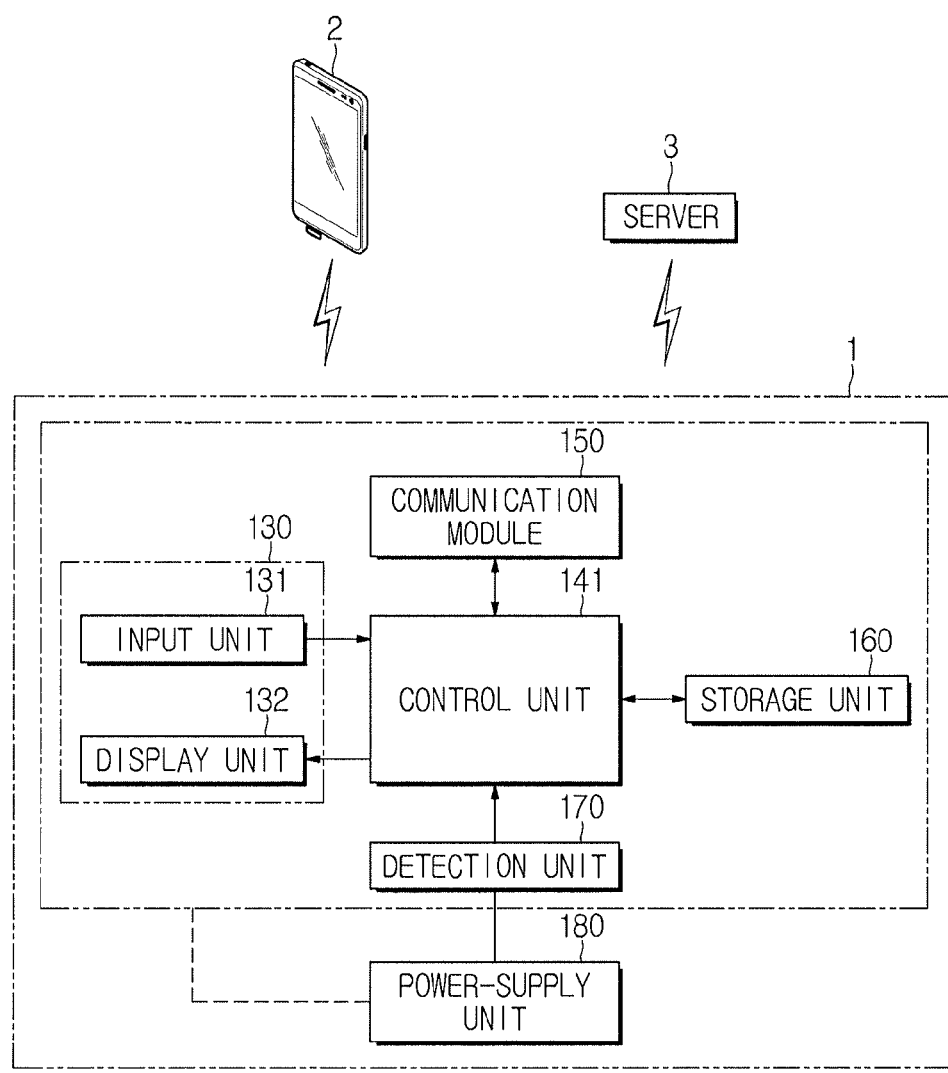
FIG. 9 is a conceptual diagram illustrating a method for controlling a vehicle according to embodiments of the present disclosure.

FIG. 9 is a conceptual diagram illustrating a method for controlling a vehicle according to embodiments of the present disclosure.

As shown in FIG. 9, the vehicle 1 may include an input unit 131 of the user interface (UI) 130, a display unit 132, a control unit 141, a communication module 150, a storage unit 160, a detection unit 170, and a power-supply unit 180.

The input unit 131 may allow the user to select the network setting function, may receive a selection command of the hotspot function through the selected network setting function, and may receive a selection command of the use range of the hotspot function.

In this case, the use range may include a first use range including the interior region of the vehicle and a range adjacent to the vehicle; and a second use range including the exterior region of the vehicle. The second use range may include a first region, a second region, and a third region which are distinguished from one another according to the distance from the vehicle.

If the network setting function is selected, the display unit 132 may display the network setting window. If the hotspot function is selected, the display unit 132 may display the hotspot setting window.

The display unit 132 may display information regarding the wirelessly connected user equipment (UE), and the selection or release information of the hotspot function. In this case, the hotspot setting window may display not only information regarding the selection or non-selection of the hotspot function, but also the use range in which the hotspot function can be used, such that information regarding the user range in which the corresponding range can be selected can be displayed on the hotspot setting window.

In addition, if the second use range is selected, the display unit 132 may display a plurality of regions. If any one of the plurality of regions is selected, the display unit 132 may display the selected region in a different way from the remaining regions. For example, the display unit 132 may display the selected region as a black-colored image, and may display the remaining regions as a gray-colored image.

Constituent elements of the display unit 132 are identical to those of the above-mentioned embodiment, and as such a detailed description thereof will herein be omitted for convenience of description. The same constituent elements as in the control unit 141 according to another embodiment will herein be omitted for convenience of description.

If the network setting function is selected through the input unit 131, the control unit 141 may control display of the network setting window. If the hotspot function from among the network setting functions is selected, the control unit 141 may control display of the selected hotspot setting window. If any one of the plurality of use ranges and a certain region are selected, the control unit 141 may transmit the selected information to the communication module 150.

If the first use range is selected, the control unit 141 may control display of the use time of the hotspot function corresponding to the first use range. If the second use range is selected, the control unit 141 may control display of the use time of the hotspot function corresponding to a plurality of regions.

The same constituent elements as in the communication module 150 according to another embodiment will herein be omitted for convenience of description.

If the selection signal of the hotspot function and the selection signal of the first use range are received, or if the selection signal of the second use range is received, the communication module may relay the wireless network using the radio waves of the first frequency band, or may relay the wireless network using the radio waves of the second frequency band. That is, the communication module 150 may provide the hotspot function.

If the first use range from among the plurality of use ranges is selected, the communication module 150 may transmit the radio waves of the first frequency band by controlling the first transceiver, and may adjust the strength of Tx radio waves to the first strength by controlling the power adjustment unit.

If the first region of the second use range is selected from among the plurality of use ranges, the communication module 150 may transmit the radio waves of the second frequency band by controlling the second transceiver, and may adjust the strength of Tx radio waves to the second strength by controlling the power adjustment unit.

If the second region of the second use range is selected from among the plurality of use ranges, the communication module 150 may transmit the radio waves of the second frequency band by controlling the second transceiver, and may adjust the strength of Tx radio waves to the third strength by controlling the power adjustment unit.

If the third region of the second use range is selected from among the plurality of use ranges, the communication module 150 may transmit the radio waves of the second frequency band by controlling the second transceiver, and may adjust the strength of Tx radio waves to the fourth strength by controlling the power adjustment unit.

In this case, the second strength may be stronger than the first strength, the third strength may be stronger than the second strength, and the fourth strength may be stronger than the third strength.

The communication module 150 may include a first antenna 151, a second antenna 152, a first transceiver 153, a second transceiver 154, a selection unit 155, a power conversion unit 156, a processor 157, a memory 158, and a power adjustment unit 159 (e.g., as shown in FIG. 4).

The first antenna 151 may emit the radio waves of the first frequency band at the first strength, and may receive external radio waves.

The second antenna 152 may emit the radio waves of the second frequency band at the second, third or fourth strength, and may receive external radio waves.

During data transmission, the first transceiver 153 may convert the AC voltage into electromagnetic waves, and may emit the electromagnetic waves into the air through the first antenna. During data reception, the first transceiver 153 may convert the electromagnetic waves received by the first antenna 151 into the AC voltage, such that the AC voltages may be transmitted to the processor 157.

During data transmission, the second transceiver 154 may convert the AC voltage into electromagnetic waves, and may emit the electromagnetic waves into the air through the second antenna. During data reception, the second transceiver 154 may convert the electromagnetic waves received by the second antenna 152 into the AC voltage, such that the AC voltages may be transmitted to the processor 157.

The selection unit 155 may control the switch contained in the selection unit upon receiving the command from the processor, such that the first transceiver or the second transceiver can be connected to the processor. That is, the selection unit 155 may transmit or receive the radio waves through the first transceiver, and may transmit or receive the radio waves through the second transceiver.

The power conversion unit 156 may convert the power supplied to the power-supply unit into the other power needed to operate the communication module 150, and may provide various constituent elements of the communication module with the conversion resultant power.

The processor 157 may receive a signal from the control unit 141, and may control the selection unit on the basis of the received signal. In more detail, if the first use range from among the plurality of use ranges is selected, the processor 157 may transmit the selection signal of the first transceiver to the selection unit. If the second use range is selected, the processor 157 may transmit the selection signal of the second transceiver to the selection unit.

If the first use range is selected, the processor 157 may adjust the strength of the radio waves communicated with the first transceiver to the first strength by controlling the power adjustment unit.

If a first region is selected in the second use range, the processor 157 may adjust the strength of the radio waves communicated with the second transceiver to the second strength by controlling the power adjustment unit.

If a second region is selected in the second use range, the processor 157 may control the power adjustment unit such that the strength of the radio waves communicated through the second transceiver can be adjusted to the third strength through the power adjustment unit.

If a third region is selected in the second use range, the processor 157 may control the power adjustment unit such that the strength of the radio waves communicated through the second transceiver can be adjusted to the fourth strength through the power adjustment unit.

If a predetermined time elapses from the execution time of the hotspot function, the processor 157 may also transmit the stop signal of the hotspot function to the external terminal. In this case, the predetermined time may be changed according to the strength of the radio waves, because power consumption of the power-supply unit is increased in proportion to the strength of the radio waves.

The memory 158 may store information regarding the frequency band for each use range, information regarding strength of radio waves of the first use range, and information regarding strength of radio waves for each region of the second use range, respectively. The memory 158 may also include the frequency band of about 5 GHz corresponding to the first use range and the frequency band of about 2.4 GHz corresponding to the second use range.

The use range may include the first use range formed by a first radius (r1) corresponding to the internal region of the vehicle, and the second use range corresponding to the external region of the vehicle.

The second use range may include a first range in which the use range of the hotspot function is used as the second radius, a second range in which the use range of the hotspot function is used as the third radius, and a third range in which the use range of the hotspot function is used as the fourth radius. The second radius may be longer than the first radius, the third radius may be longer than the second radius, and the fourth radius may be longer than the third radius.

The power adjustment unit 150 may adjust the strength of radio waves to any one of the first to fourth strengths on the basis of the command of the processor 157. That is, the power adjustment unit 159 may adjust the strength of radio waves to the first strength when the first use range is selected. The power adjustment unit 159 may adjust the strength of radio waves to the second strength when the first range of the second use range is selected. The power adjustment unit 159 may adjust the strength of radio waves to the third strength when the second region of the second use range is selected. The power adjustment unit 159 may adjust the strength of radio waves to the fourth strength when the third range of the second use range is selected.

The power adjustment unit 159 may include at least one of the voltage adjustment unit and the current adjustment unit.

The storage unit 160 and the detection unit 170 shown in FIG. 9 are identical to those of the previous embodiments, and as such a detailed description thereof will herein be omitted for convenience of description.

Figure 10:
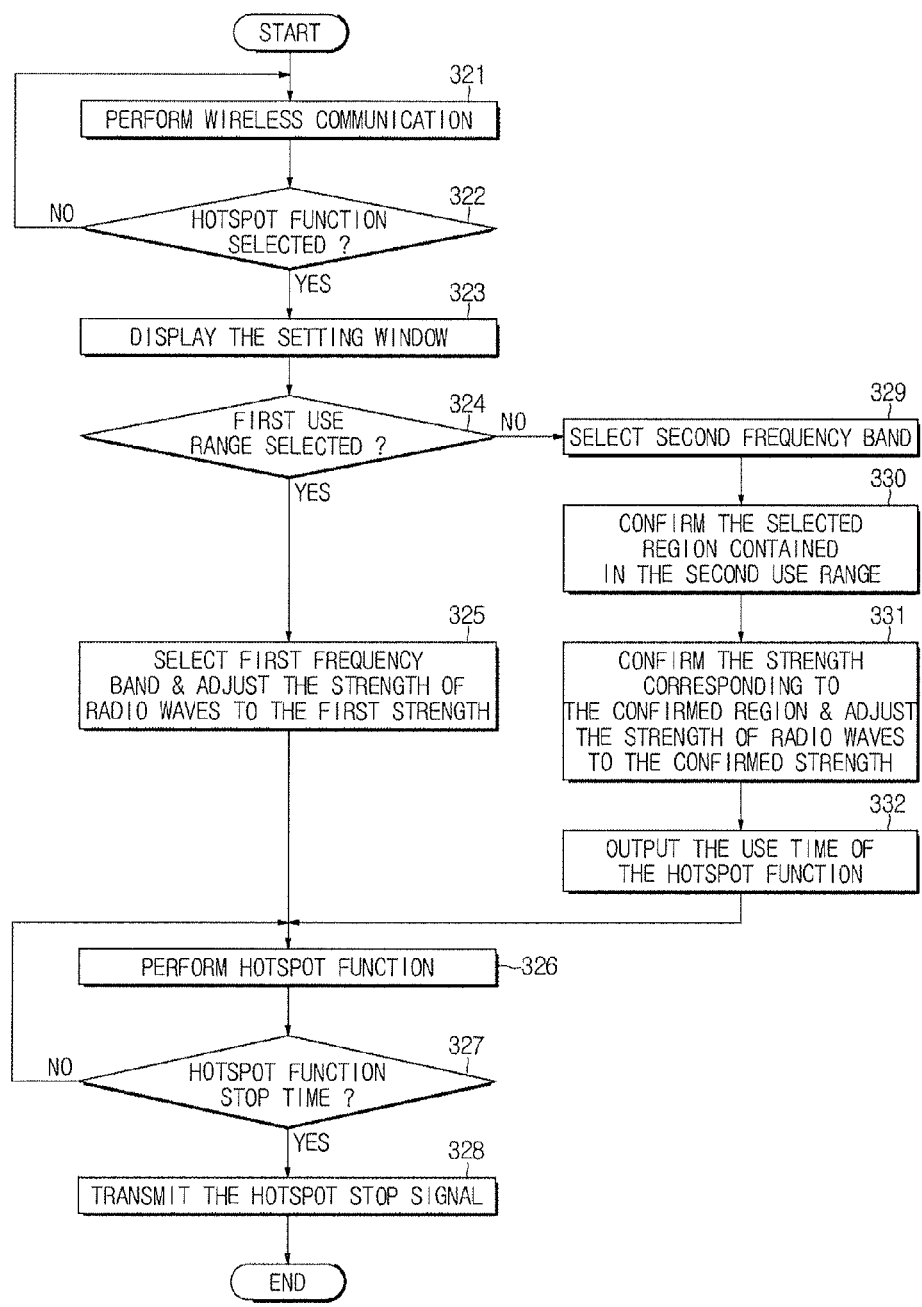
FIG. 10 is a flowchart illustrating a method for controlling a vehicle according to embodiments of the present disclosure.

FIG. 10 is a flowchart illustrating a method for controlling a vehicle according to embodiments of the present disclosure. The method for controlling the vehicle shown in FIG. 10 will hereinafter be described with reference to FIGS. 11A and 11B.

As shown in FIG. 10, the vehicle may wirelessly communicate with the service when the vehicle starts operation or stops operation in operation 321.

If the network setting function is selected through the input unit 131, the vehicle 131 may display the network setting window.

If the user selects the hotspot function from among the network setting functions in operation 322, the vehicle may display the selected hotspot setting window in operation 323.

The display unit 132 of the vehicle may display the hotspot selection box. If the selection signal of the hotspot selection box is received by the input unit 131, information regarding the first use range (i.e., an internal region of the vehicle) and information regarding the second use range (i.e., an external region of the vehicle) are displayed as shown in FIG. 6. In this case, the displaying the first and second use ranges may include activating the selection box of the first use range and the selection box of the second use range; and displaying the activated selection boxes.

If any one of the first use range and the second use range is selected, the selection box of the unselected use range may be deactivated. In this case, the activating the selection boxes may include displaying the corresponding selection box with a darker color as compared to the unselected selection box.

If the second use range is selected, the vehicle may display the first region, the second region, and the third region on the display unit, and at the same time may display the selection box.

In accordance with embodiments, the input unit 131 acting as a touch panel may be incorporated with the display unit 132. That is, the input unit and the display unit may be implemented as a touchscreen.

The vehicle may receive the selection signal of the selection range or range from the input unit 131, may confirm the received selection signal, and may transmit the selection signal of the confirmed selection range to the communication module 150. If the communication module of the vehicle receives the selection signal of the first use range from among the plurality of use ranges in operation 324, the first frequency band may be selected as the frequency band of radio waves.

That is, the communication module of the vehicle may control the selection unit such that radio waves of the first frequency band can be communicated through the first transceiver. In this case, the communication module may adjust the strength of radio waves of the first frequency band to the first strength by controlling the power adjustment unit in operation 325.

Figure 11A:
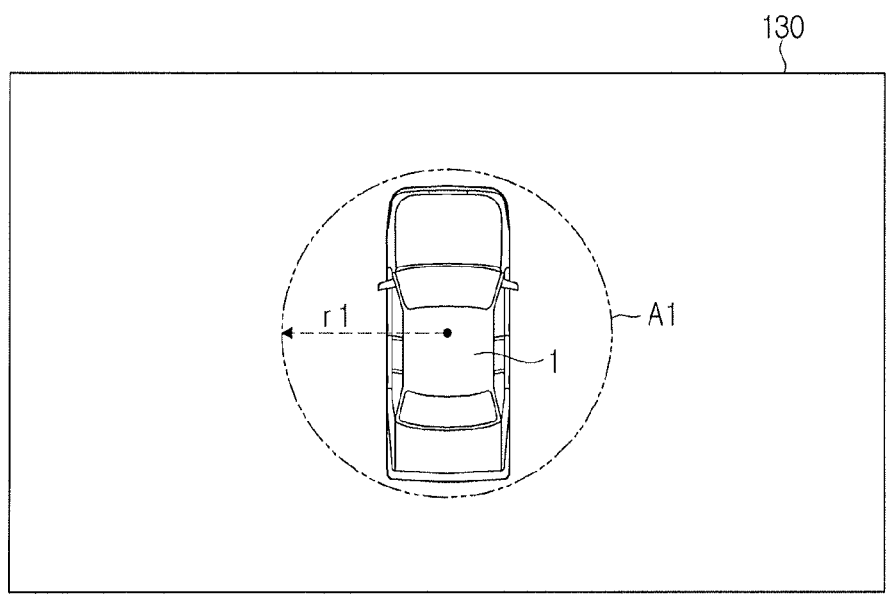
FIGS. 11A and 11B are conceptual diagrams illustrating a method for displaying information regarding the use range of a hotspot function of a vehicle according to embodiments of the present disclosure.

As shown in FIG. 11A, the vehicle 1 may display the use range (A1) of the first radius (r1) in which the hotspot function can be used on the basis of the vehicle position, on the display unit 132 of the terminal.

The vehicle 1 may relay the wireless network within the range of the first radius (R1) using the first-strength radio waves of the first frequency band.

If the communication module of the vehicle receives the selection signal of any one of the second use ranges from among the plurality of use ranges, the second frequency band is selected as the frequency band of the radio waves in operation 326. That is, the communication module of the vehicle may transmit the radio waves having the second frequency band through the second transceiver by controlling the selection unit. In this case, the communication module may confirm one selected region in operation 327, may confirm the strength of radio waves corresponding to the confirmed region, and may control the power adjustment unit on the basis of the confirmed strength, thereby adjusting the strength of radio waves in operation 328.

Figure 11B:
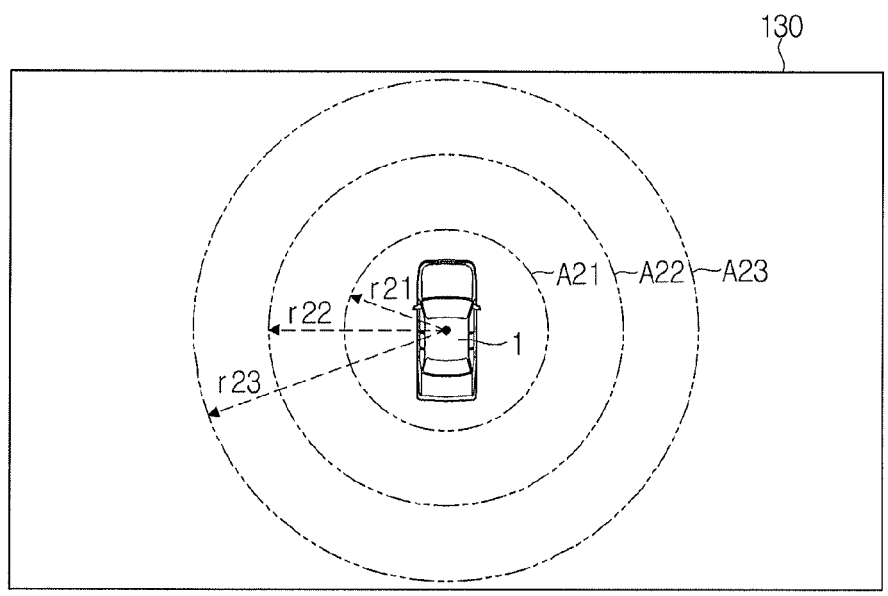

As shown in FIG. 11B, the vehicle 1 may display a second region (A21) of the second radius (r21) in which the hotspot function can be used on the basis of the vehicle position, a third region (A22) of the third radius (r22), and a fourth region (A23) of the fourth radius (r23) on the display unit 132 of the terminal.

In addition, the vehicle 1 may also output the use time of the hotspot function for each region of the second use range in operation 329. In this case, the vehicle may confirm the use time corresponding to the selected region, and may display the confirmed use time on the display unit.

If the first region (A21) is selected, the vehicle 1 may relay the wireless network within the region having the second radius (r21) using the second-strength radio waves of the second frequency band. If the second region (A22) is selected, the vehicle 1 may relay the wireless network within the region having the third radius (r22) using the third-strength radio waves of the second frequency band. If the third region (A23) is selected, the vehicle 1 may relay the wireless network within the region having the fourth radius (r23) using the fourth-strength radio waves of the second frequency band.

As described above, the vehicle may perform the hotspot function by adjusting the frequency band of radio waves and the strength of the radio waves on the basis of the use range selected by the user in operation 330. That is, the external terminal may implement the wireless network using the hotspot function provided from the internal or external communication module of the vehicle.

During the execution time of the hotspot function, the vehicle may determine whether the current time is a stop time of the hotspot function in operation 331. If the stop time of the hotspot function is decided, the vehicle may transmit the hotspot stop signal to the server or the external terminal in operation 332. In this case, the determining whether the current time is the stop time of the hotspot function may include determining whether the amount of used data reaches the predetermined amount of data.

In addition, the determining whether the current time is the stop time of the hotspot function may include determining whether the charge amount of the power-supply unit of the vehicle is less than or equal to a reference charge amount.

In addition, the determining whether the current time is the stop time of the hotspot function may include determining whether a predetermined time has elapsed from the start time of the hotspot function.

In more detail, if the hotspot function is selected on the condition that the vehicle stops operation, the detection unit may confirm the charge amount of the power-supply unit 180. If the detected charge amount is equal to or less than the reference charge amount, the detection unit may transmit the stop signal of the hotspot function to the server 3. In this case, the server 3 may transmit the stop signal of the hotspot function to the external terminal 2.

Irrespective of the on/off operations of the vehicle, if the hotspot function is selected, the vehicle may confirm the amount of data used for a predetermined time, and may compare the amount of used data with a predetermined amount of data. If the amount of used data is equal to a predetermined amount of data, the stop signal of the hotspot function is transmitted to the server 3. In this case, the server 3 may transmit the stop signal of the hotspot function to the external terminal 2.

In addition, the server 3 may also confirm the amount of used data through the communication module of the vehicle during a predetermined time. That is, the server 3 may transmit the stop signal of the hotspot function to the external terminal on the basis of the predetermined amount of data and the amount of used data.

Assuming that the detection unit is not included, if a predetermined time has elapsed from the start time of the hotspot function so as to prevent the power-supply unit from being discharged, the stop signal of the hotspot function may also be transmitted to the server 3 or the external terminal 2.

If connection between the vehicle and the terminal 2 is severed during the hotspot execution time, the vehicle may switch to the sleep mode. If the vehicle 2 is reconnected to the external terminal 2, the vehicle may switch from the sleep mode to the normal mode, such that the hotspot function can be carried out in the external terminal 2.

In addition, after lapse of a predetermined time from the transmission time of the stop signal of the hotspot function, the vehicle may enter the sleep mode.

If the vehicle receives a remote signal on the condition that the hotspot function stops operation by the charge amount of the power-supply unit, the vehicle starts operation, begins to charge the power-supply unit, and switches from the sleep mode to the normal mode, such that the hotspot function can be performed again.

Figure 12:
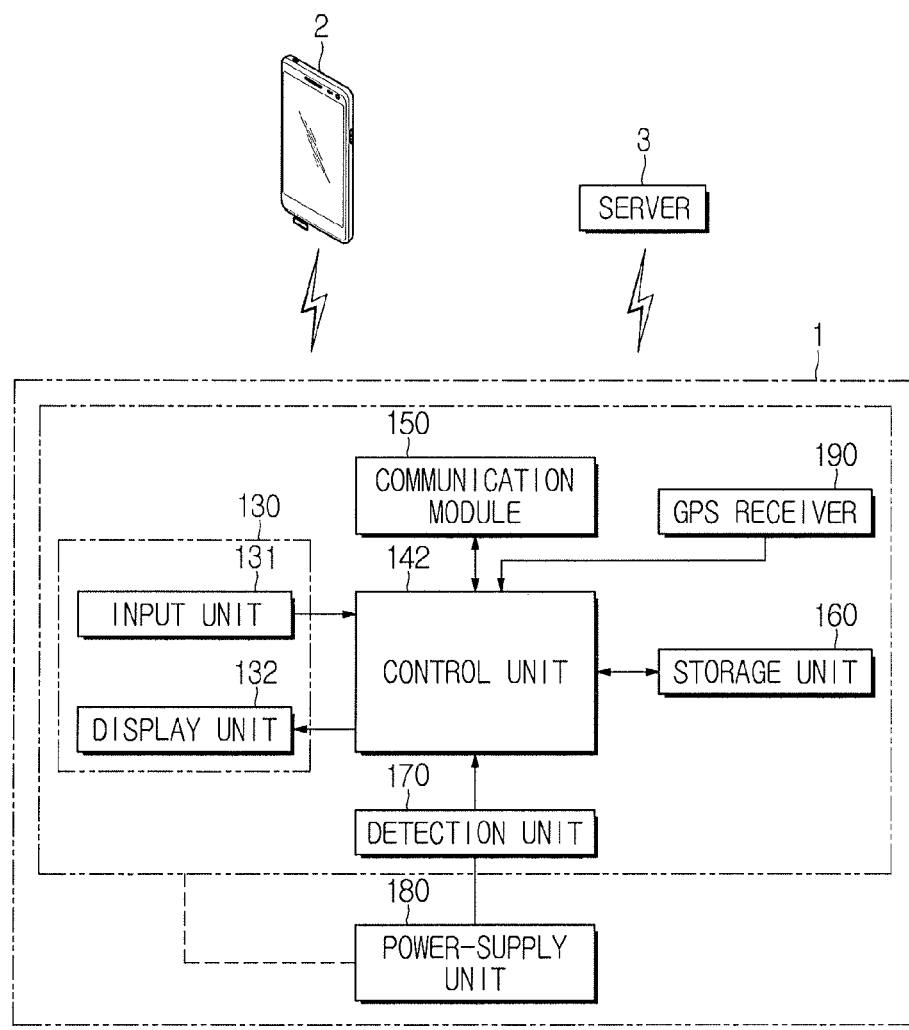
FIG. 12 is a conceptual diagram illustrating a method for controlling a vehicle according to embodiments of the present disclosure.

FIG. 12 is a conceptual diagram illustrating a method for controlling a vehicle according to embodiments of the present disclosure.

As shown in FIG. 12, the vehicle 1 may include an input unit 131 of the user interface (UI) 130, a display unit 132, a control unit 142, a communication module 150, a storage unit 160, a detection unit 170, a power-supply unit 180, and a GPS receiver 190. The same components (i.e., storage unit, detection unit, and power-supply unit) as in the above embodiments will herein be omitted for convenience of description.

The input unit 131 may receive the selection signal of the network setting function, and may receive the hotspot function through the selected network setting function.

If the network setting function is selected, the display unit 132 may display the network setting window. If the hotspot function is selected, the display unit 132 may display the hotspot setting window. The display unit 132 may display information of the wirelessly connected user equipment (UE), and information regarding the selection or release of the hotspot function.

The GPS receiver 190 may be a location receiver configured to receive the current position. The GPS receiver 190 acting as the position receiver may receive satellite signals from a plurality of GPS satellites so as to calculate the vehicle position, and information regarding the calculated current position of the vehicle is transmitted to the control unit 142.

The same components as those of the control unit of the above-mentioned embodiment from among the plurality of constituent elements of the control unit 142 shown in another embodiment will herein be omitted for convenience of description.

If the network setting function is selected through the input unit 131, the control unit 142 may control display of the network setting window. If the hotspot function from among the network setting functions is selected, the control unit 142 may control display of the selected hotspot setting window.

If the hotspot function is selected, the control unit 142 may receive the current position information of the vehicle from the GPS receiver 190, may receive UE position information from the external terminal 2, may compare the received vehicle position information with the UE position information so as to obtain the distance between the vehicle and the terminal (or UE), and may transmit the obtained distance information to the communication module 150.

Upon receiving the selection signal of the hotspot function and the distance information, the communication module 150 may relay the wireless network using radio waves of the first frequency band on the basis of the received distance information, or may relay the wireless network using radio waves of the second frequency band. That is, the communication module 150 may provide the hotspot function.

The communication module 150 may determine the UE position on the basis of the distance information. If the determined UE position is located within the first use range having the first radius, the communication module 150 may transmit the radio waves of the first frequency band by controlling the first transceiver, and may adjust the strength of transmitted (Tx) radio waves to the first strength by controlling the power adjustment unit.

The communication module 150 may confirm the UE position on the basis of the distance information. If the confirmed UE position escapes from the first use range, the communication module 150 may transmit radio waves of the second frequency band by controlling the second transceiver, and may control the power adjustment unit in such a manner that the strength of radio waves can be adjusted on the basis of the distance information.

In addition, an exemplary case in which the second selection range includes a plurality of regions will hereinafter be given.

If the terminal (or UE) is located outside of the first use range and is located in the first range, the communication module 150 may transmit the radio waves of the second frequency band by controlling the second transceiver, and may adjust the strength of Tx radio waves to the second strength by controlling the power adjustment unit.

If the terminal (or UE) is located outside of the first use range and is located in the second range, the communication module 150 may transmit the radio waves of the second frequency band by controlling the second transceiver, and may adjust the strength of Tx radio waves to the third strength by controlling the power adjustment unit.

If the terminal (or UE) is located outside of the second use range and is located in the third range, the communication module 150 may transmit the radio waves of the second frequency band by controlling the second transceiver, and may adjust the strength of Tx radio waves to the fourth strength by controlling the power adjustment unit. In this case, the second strength may be higher than the first strength, the third strength may be higher than the second strength, and the fourth strength may be higher than the third strength.

If the distance between the communication module 150 and the terminal (or UE) is equal to or shorter than a reference distance, the communication module 150 may transmit the radio waves of the first frequency band. If the distance between the communication module 150 and the terminal (or UE) is longer than the reference distance, the communication module 150 may transmit the radio waves of the second frequency band. The communication module 150 may confirm the strength information corresponding to the distance information, and may also control the power adjustment unit on the basis of the confirmed strength information.

The communication module 150 may include a first antenna 151, a second antenna 152, a first transceiver 153, a second transceiver 154, a selection unit 155, a power conversion unit 156, a processor 157, a memory 158, and a power adjustment unit 159 (e.g., see FIG. 4).

The second antenna 152, the first transceiver 153, the second transceiver 154, the selection unit 155, and the power conversion unit 156 according to another embodiment of the present disclosure are identical to those of the above-mentioned embodiment, and as such a detailed description thereof will herein be omitted for convenience of description.

The processor 157 may receive signals from the control unit 142, and may control the selection unit on the basis of the received signals. In more detail, the processor 157 may transmit the selection signal of the first transceiver to the selection unit when the terminal (or UE) is located in the first use range on the basis of the distance information, and may transmit the selection signal of the second transceiver to the selection unit when the terminal (or UE) is located in the second use range.

If the terminal 2 (or UE) is located in the first use range, the processor 157 may adjust the strength of Tx/Rx radio waves communicated through the first transceiver to the first strength by controlling the power adjustment unit.

If the terminal 2 (or UE) is located in the second use range, the processor 157 may adjust the strength of Tx/Rx radio waves communicated through the second transceiver to the second strength by controlling the power adjustment unit.

An exemplary case in which a plurality of second use ranges is present will hereinafter be given.

If the terminal (or UE) is located in the first region of the second use range, the processor 157 may adjust the strength of Tx/Rx radio waves communicated through the second transceiver to the second strength by controlling the power adjustment unit.

If the terminal (or UE) is located in the second region of the second use range, the processor 157 may adjust the strength of Tx/Rx radio waves communicated through the second transceiver to the third strength by controlling the power adjustment unit.

If the terminal (or UE) is located in the third region of the second use range, the processor 157 may adjust the strength of Tx/Rx radio waves communicated through the second transceiver to the fourth strength by controlling the power adjustment unit.

If the terminal (or UE) is located in the third region of the second use range, the processor 157 may adjust the strength of Tx/Rx radio waves communicated through the second transceiver to the fourth strength by controlling the power adjustment unit.

The memory 158 may store information regarding the frequency band for each use range, information regarding the strength of radio waves of the first use range, and information regarding the strength of radio waves for each region of the second use range, respectively. The memory 158 may include the frequency band of about 5 GHz corresponding to the first use range and the frequency band of about 2.4 GHz corresponding to the second use range.

The use range may include the first use range formed by a first radius (r1) corresponding to the internal region of the vehicle, and the second use range corresponding to the external region of the vehicle.

The second use range may include a first range in which the use range of the hotspot function is used as the second radius, a second range in which the use range of the hotspot function is used as the third radius, and a third range in which the use range of the hotspot function is used as the fourth radius. The second radius may be longer than the first radius, the third radius may be longer than the second radius, and the fourth radius may be longer than the third radius.

The memory 158 may also store information regarding the strength of radio waves corresponding to the reference distance, and information regarding the strength of radio waves corresponding to the distance information.

The power adjustment unit 150 may adjust the strength of radio waves to any one of the first to fourth strengths on the basis of the command of the processor 157.

The power adjustment unit 159 may include at least one of the voltage adjustment unit and the current adjustment unit.

Figure 13:
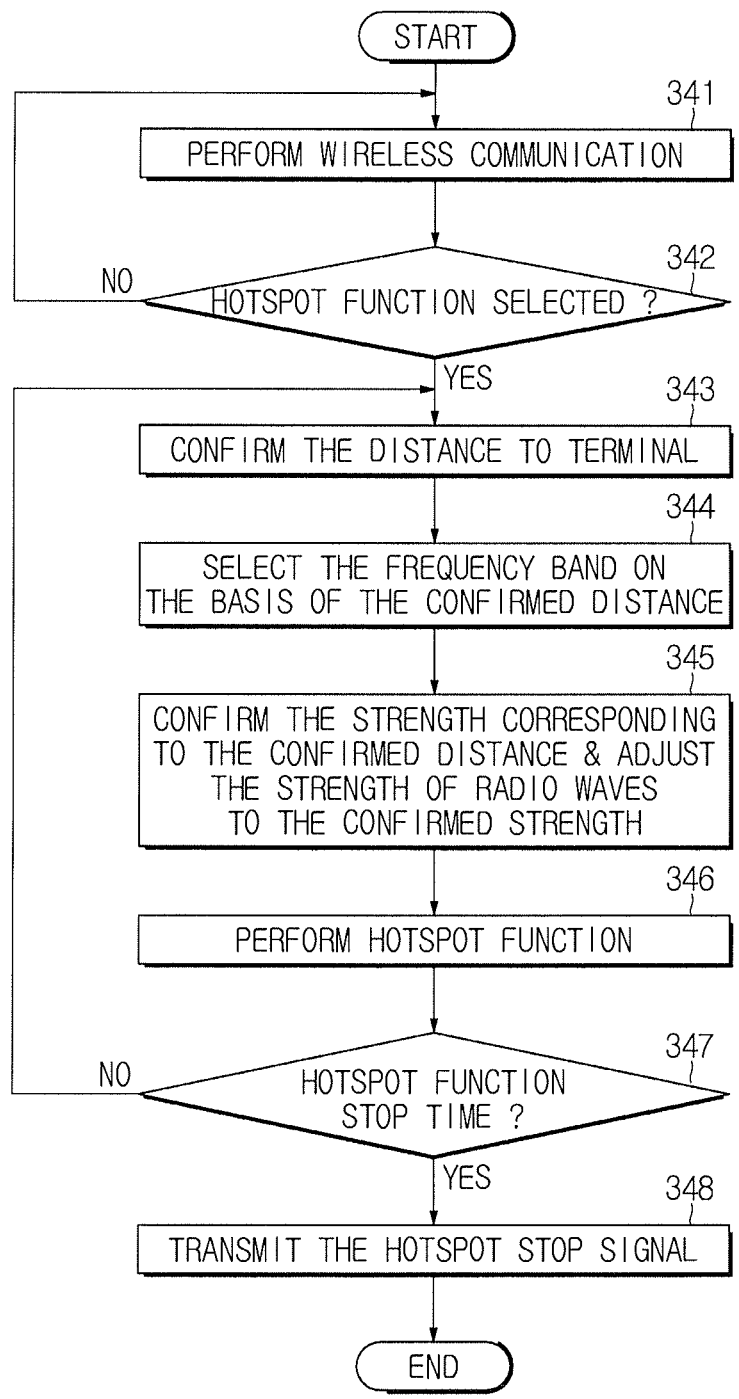
FIG. 13 is a flowchart illustrating a method for controlling the vehicle according to embodiments of the present disclosure.

FIG. 13 is a flowchart illustrating a method for controlling the vehicle according to embodiments of the present disclosure.

As shown in FIG. 13, the vehicle may communicate with the server wirelessly on the condition that the vehicle starts operation or stops operation in operation 341.

If the network setting function is selected through the input unit 131, the vehicle may display the network setting window.

If the hotspot function from among the network setting functions is selected by the user in operation 342, the vehicle may receive current position information thereof from the GPS receiver 190, may receive UE position information from the external terminal (or UE) 2, may compare the received current position information of the vehicle with the terminal (or UE) position information, and may confirm the distance between the vehicle and the terminal (or UE) in operation 343.

The communication module of the vehicle may determine the use range of the hotspot function on the basis of the determined distance, and may display the use range of the confirmed hotspot function.

The communication module of the vehicle may select the frequency band based on the determined distance in operation 344, and may control the selection unit by confirming the transceiver configured to transmit the radio waves to the selected frequency band, such that the radio waves can be transmitted through the selected transceiver.

The communication module of the vehicle may determine the strength of radio waves corresponding to the determined distance, and may adjust the strength of the radio waves to the determined strength in operation 345.

In addition, the communication module of the vehicle may determine whether the terminal (or UE) position belongs to the first use range or the second use range on the basis of the confirmed distance, and may also adjust the frequency band and strength of the radio waves.

In addition, if the terminal (or UE) is located in the second use range, the communication module of the vehicle may determine which one of the regions of the second use range includes the terminal (or UE), and may also adjust the strength of radio waves on the basis of the determined region information.

As described above, the vehicle may adjust the frequency band and strength of radio waves on the basis of the distance to the terminal (or UE) 2, such that the vehicle can perform the hotspot function in operation 346. That is, the external terminal may implement the wireless network using the hotspot function provided from the internal or external communication module of the vehicle.

During the execution time of the hotspot function, the vehicle may determine whether the current time is a stop time of the hotspot function in operation 347. If the stop time of the hotspot function is decided, the vehicle may transmit the hotspot stop signal to the server or the external terminal in operation 348. In this case, the determining whether the current time is the stop time of the hotspot function may include determining whether the amount of used data reaches the predetermined amount of data.

In addition, the determining whether the current time is the stop time of the hotspot function may include determining whether the charge amount of the power-supply unit of the vehicle is equal to or less than a reference charge amount.

In more detail, if the hotspot function is selected on the condition that the vehicle stops operation, the vehicle may determine the charge amount (detected by the detection unit) of the power-supply unit 180. If the determined charge amount is equal to or less than the reference charge amount, the vehicle may transmit the stop signal of the hotspot function to the server 3. In this case, the server 3 may transmit the stop signal of the hotspot function to the external terminal 2.

If the hotspot function is selected irrespective of the ON/OFF operations of the vehicle starting, the vehicle may confirm the amount of data used during the setting time. After the amount of used data is compared with the predetermined data amount, if the amount of used data is equal to or higher than a predetermined amount of data, the vehicle may transmit the stop signal of the hotspot function to the server 3. In this case, the server 3 may transmit the stop signal of the hotspot function to the external terminal 2.

In addition, the server 3 may determine the amount of used data through the communication module of the vehicle during the predetermined period of time. That is, the server 3 may transmit the stop signal of the hotspot function to the external terminal on the basis of the amount of used data and the predetermined amount of data.

Assuming that the detection unit is not included, if a predetermined time has elapsed from the start time of the hotspot function so as to prevent the power-supply unit from being discharged, the stop signal of the hotspot function may also be transmitted to the server 3 or the external terminal 2.

If connection between the vehicle and the terminal 2 is severed during the hotspot execution time, the vehicle may switch to the sleep mode. If the vehicle 2 is reconnected to the external terminal 2, the vehicle may switch from the sleep mode to the normal mode, such that the hotspot function can be carried out in the external terminal 2.

In addition, after lapse of a predetermined time from the transmission time of the stop signal of the hotspot function, the vehicle may enter the sleep mode. If the vehicle receives a remote signal on the condition that the hotspot function stops operation by the charge amount of the power-supply unit, the vehicle starts operation, begins to charge the power-supply unit with electricity, and switches from the sleep mode to the normal mode, such that the hotspot function can be performed again.

Figure 14:
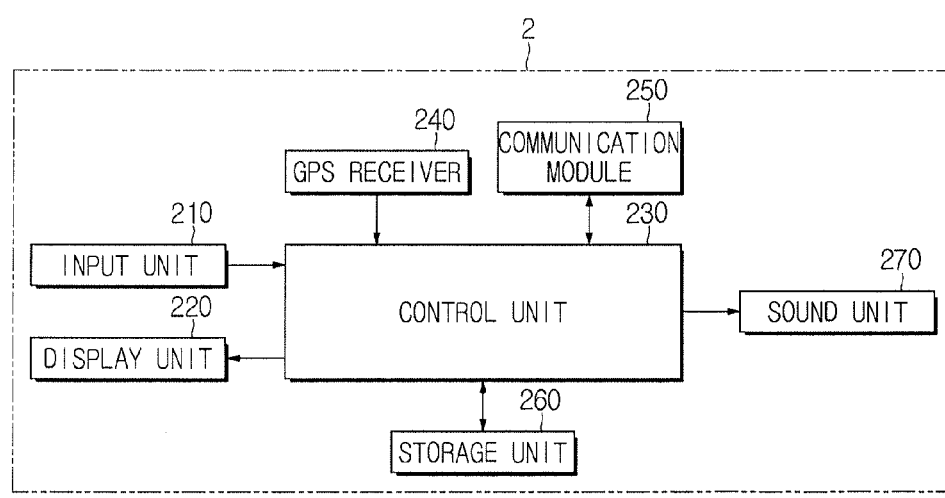
FIG. 14 is a block diagram illustrating an external terminal communicating with the vehicle according to embodiments of the present disclosure.

FIG. 14 is a block diagram illustrating the terminal 2 communicating with the vehicle according to embodiments of the present disclosure.

As shown in FIG. 14, the terminal (or UE) 2 may include an input unit 210, a display unit 220, a control unit 230, a GPS receiver 240, a communication unit 250, a storage unit 260, and a sound unit 270.

The input unit 210 may receive the network setting selection signal, and may receive information regarding the communication module of the vehicle.

The display unit 220 may display whether the hotspot function is used, and may display the hotspot function stop information, data information, the hotspot use information, etc. The display unit 220 may display image information of the program executed by the terminal (or UE).

The control unit 230 may control communication with the server through the communication module of the vehicle, and may control various Internet functions.

Upon receiving the stop signal of the hotspot function from the server or the vehicle communication module, the control unit 240 may control the output of the hotspot function stop information.

In addition, after the control unit 230 receives the stop signal of the hotspot function, the control unit 230 may also automatically sever the hotspot connection after lapse of a predetermined time.

Upon receiving the position provision request signal from the vehicle communication module, the control unit 230 may confirm the current position of the terminal, and may transmit the confirmed terminal position information to the communication module of the vehicle. The control unit 230 may also transmit a connection request signal for reconnection to the vehicle communication module as necessary. The control unit 230 may also transmit the vehicle starting ON signal upon receiving the hotspot stop signal caused by the discharging of the power-supply unit of the vehicle.

The GPS receiver 240 may receive the current position information of the terminal (or UE), and may transmit the received position information to the control unit 230.

The communication unit 250 may communicate with the server 3 through the hotspot function of the vehicle communication module.

The storage unit 260 may store information regarding the server and the vehicle.

The sound unit 270 may output sound information of the program executed by the terminal (or UE).

As is apparent from the above description, the embodiments of the present disclosure can perform wireless communication using the hotspot function of the communication module embedded in the vehicle even when a user is located outside of the vehicle.

If the vehicle stops driving, the charge amount of the power-supply unit of the vehicle is supplied to the terminal such that it can prevent the hotspot function from being used. In addition, the data amount is confirmed and supplied to the terminal, such that the hotspot function can be prevented from being used. Account data regarding the used data is supplied to the terminal such that the user can properly use the hotspot function.

When the user located outside of the vehicle uses the hotspot function, the embodiments of the present disclosure can adjust strength of radio waves on the basis of the distance between the vehicle and the terminal, such that the embodiments can minimize limitation of the distance to the vehicle when the hotspot function is used. The embodiments can improve quality of a communication module and vehicle, can increase user satisfaction, and can also improve user convenience.

Although certain embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A communication module comprising:
a first transceiver configured to transmit and receive a signal using radio waves of a first frequency band;
a second transceiver configured to transmit and receive a signal using radio waves of a second frequency band;
a selection unit configured to select one of the first transceiver and the second transceiver;
a processor configured to receive a use range of a hotspot function when the hotspot function is selected and to control the selection unit to select one of the first transceiver and the second transceiver is selected; and
a power adjustment unit configured to adjust power in such a manner that a strength of radio waves is adjusted according to the received use range.

2. The communication module according to claim 1, wherein:
the use range includes a first use range and a second use range larger than the first use range, and
the processor is further configured to control the selection unit to select the first transceiver upon receiving a selection signal of the first use range and to control the selection unit to select the second transceiver upon receiving a selection signal of the second use range.

3. The communication module according to claim 2, wherein the processor is further configured to control the power adjustment unit to adjust the strength of radio waves to a first strength when the first transceiver is selected and to control the power adjustment unit to adjust the strength of radio waves to a second strength when the second transceiver is selected.

4. The communication module according to claim 2, wherein the processor is further configured to transmit a stop signal of the hotspot function to an external terminal after lapse of a predetermined time from an execution time of the hotspot function.

5. A vehicle comprising:
an input unit configured to receive a hotspot function and a use range;
a communication module including a first transceiver configured to transmit and receive a signal using radio waves of a first frequency band and a second transceiver configured to transmit and receive a signal using radio waves of a second frequency band, the communication module configured to communicate with an external server and an external terminal using the first transceiver and the second transceiver;
a controller configured to, when the hotspot function and the use range are selected, transmit information regarding the selected hotspot function and the selected use range to the communication module; and
a display unit configured to display information regarding the selected hotspot function and the selected use range,
wherein the communication module is further configured to select one of the first transceiver and the second transceiver based on the selected use range information and to adjust a strength of radio waves according to the selected use range.

6. The vehicle according to claim 5, wherein the controller is further configured to control the display unit to display a use available time of the hotspot function corresponding to the selected use range information.

7. The vehicle according to claim 5, wherein:
the use range includes a first use range corresponding to an internal region of the vehicle and a second use range corresponding to an external region of the vehicle; and
the communication module is further configured to select the first transceiver when the first use range is selected and to select the second transceiver when the second use range is selected.

8. The vehicle according to claim 5, wherein the communication module is further configured to adjust the strength of radio waves to a first strength when the first use range is selected and to adjust the strength of radio waves to a second strength when the second use range is selected.

9. The vehicle according to claim 5, wherein the communication module is further configured to transmit a stop signal of the hotspot function to an external terminal after lapse of a predetermined time from an execution time of the hotspot function.

10. The vehicle according to claim 5, further comprising:
a power-supply unit configured to perform charging or discharging; and
a detection unit configured to detect a charge amount of the power-supply unit,
wherein the controller is further configured to transmit a stop signal of the hotspot function to an external terminal when the detected charge amount is less than or equal to a reference charge amount.

11. The vehicle according to claim 5, wherein:
the second use range includes a plurality of regions having differing radii based on a vehicle position; and
the communication module is further configured to, when any one of the plurality of regions included in the second use range is selected, adjust the strength of radio waves according to a radius of the selected region.

12. The vehicle according to claim 11, wherein the communication module is further configured to increase the strength of radio waves in proportion to the increasing radius of the selected region.

13. A vehicle comprising:
an input unit configured to receive a selection signal of a hotspot function;
a position receiver configured to receive a current position of the vehicle;
a communication module including a first transceiver configured to transmit and receive a signal using radio waves of a first frequency band and a second transceiver configured to transmit and receive a signal using radio waves of a second frequency band, the communication module configured to communicate with an external server and an external terminal using the first transceiver and the second transceiver; and
a controller configured to, when the hotspot function and the use range are selected, transmit information regarding the selected hotspot function and the selected use range to the communication module,
wherein the communication module is further configured to select one of the first transceiver and the second transceiver based on distance information and to adjust a strength of transmitted radio waves based on the distance information.

14. The vehicle according to claim 13, wherein the communication module is further configured to determine a use time of the hotspot function corresponding to a distance to the external terminal and to transmit a use time of the determined hotspot function to the external terminal.

15. The vehicle according to claim 14, wherein the communication module is further configured to select the first transceiver when the determined distance is shorter than a reference distance and to select the second transceiver when the determined distance is greater than or equal to the reference distance.

16. The vehicle according to claim 15, wherein the communication module is further configured to adjust the strength of radio waves to a first strength when the determined distance is less than a reference distance and to adjust the strength of radio waves to a second strength when the determined distance is greater than or equal to the reference distance.

17. The vehicle according to claim 15, wherein the communication module is further configured to, when the determined distance is greater than or equal to the reference distance, adjust the strength of radio waves according to respective distances and to increase the strength of radio waves in proportion to the increasing distance.

18. The vehicle according to claim 17, further comprising:
a power-supply unit configured to perform charging or discharging; and
a detection unit configured to detect a charge amount of the power-supply unit,
wherein the controller is further configured to transmit a stop signal of the hotspot function to the external terminal when the detected charge amount is less than or equal to a reference charge amount.

19. The vehicle according to claim 15, wherein the controller is further configured to determine an amount of available data and to transmit information regarding the determined amount of available data to the external terminal.

20. The vehicle according to claim 15, wherein the controller is further configured to determine whether the external terminal is in a connected state and to switch to a sleep mode when the external terminal is in a disconnected state.

* * * * *